US012779720B2

(12) United States Patent
Thompson et al.

(10) Patent No.: US 12,779,720 B2
(45) Date of Patent: Nov. 3, 2026

(54) CAM MECHANISM FOR SPLIT BLADE HOUSING OF POWER OPERATED ROTARY KNIFE

(71) Applicant: Bettcher Industries, Inc., Birmingham, OH (US)

(72) Inventors: Terry J. Thompson, Wakeman, OH (US); Joel L. Hall, North Ridgeville, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 468 days.

(21) Appl. No.: 17/887,132

(22) Filed: Aug. 12, 2022

(65) Prior Publication Data

US 2023/0053515 A1 Feb. 23, 2023

Related U.S. Application Data

(60) Provisional application No. 63/235,498, filed on Aug. 20, 2021.

(51) Int. Cl.
*A22B 5/16* (2006.01)
*B26B 25/00* (2006.01)

(52) U.S. Cl.
CPC ............ *B26B 25/002* (2013.01); *A22B 5/165* (2013.01)

(58) Field of Classification Search
CPC ....... B26B 25/002; A22B 5/165; A22C 17/04; A22C 17/12; A22C 17/004
(Continued)

(56) References Cited

U.S. PATENT DOCUMENTS

| | | | |
|---|---|---|---|
| 1,220,345 | A | 3/1917 | Koster |
| 1,374,988 | A | 4/1921 | Cooper |

(Continued)

FOREIGN PATENT DOCUMENTS

| | | |
|---|---|---|
| CA | 2796222 | 10/2011 |
| CA | 2883924 | 3/2014 |

(Continued)

OTHER PUBLICATIONS

Oct. 3, 2011 Decision and Opinion of the United States Court of Appeals for the Federal Circuit (Appeal No. 2011-1038,-1046) regarding the case styled *Bettcher Industries, Inc.* v. *Bunzl USA, Inc. and Bunzl Processor Distribution, LLC*, Case No. 3:08 cv 2423, U.S. District Court for the Northern District of Ohio, Judge Zouhary. The Decision and Opinion relates to U.S. Pat. No. 7,000,325, owned by the assignee of the present application. (47 pages).

(Continued)

*Primary Examiner* — Hwei-Siu C Payer
(74) *Attorney, Agent, or Firm* — Watts Law LLC; George L. Pinchak, Esq.

(57) ABSTRACT

A cam mechanism bridging a split through a mounting section of a split blade housing of a power operated rotary knife for moving the split blade housing between the first, blade supporting position and the second blade changing position. The cam mechanism includes a cam plate including an opening and a cam member supported for rotation by the cam plate. The cam member includes first and second surfaces spaced apart by a side wall, the cam member first surface including first and second cam pins extending from the first surface. The cam member second surface includes a boss extending from the second surface. The boss of the cam member being received in the cam plate opening. The side wall of the cam member is symmetric with respect to a diagonal plane intersecting the first and second cam pins and (Continued)

extending substantially parallel to the cam member axis of rotation.

20 Claims, 16 Drawing Sheets

(58) Field of Classification Search
USPC .................................................... 30/347, 276
See application file for complete search history.

(56) References Cited

U.S. PATENT DOCUMENTS

| | | | | |
|---|---|---|---|---|
| 1,476,345 | A | 12/1923 | McGee | |
| 1,966,266 | A | 7/1934 | Skelly | |
| 2,656,012 | A | 10/1953 | Thorpe | |
| 2,827,657 | A | 3/1958 | Bettcher | |
| 3,024,532 | A | 3/1962 | Bettcher | |
| 3,150,409 | A | 9/1964 | Wilcox | |
| RE25,947 | E | 12/1965 | Bettcher | |
| 3,269,010 | A | 8/1966 | Bettcher | |
| 3,349,485 | A | 10/1967 | Bettcher | |
| 3,461,557 | A | 8/1969 | Behring | |
| 3,512,519 | A | 5/1970 | Hall | |
| 3,592,519 | A | 7/1971 | Martin | |
| 3,688,403 | A | 9/1972 | Bettcher | |
| 3,816,875 | A | 6/1974 | Duncan et al. | |
| 3,852,882 | A | 12/1974 | Bettcher | |
| 3,897,998 | A | 8/1975 | Someya | |
| 4,082,232 | A | 4/1978 | Brewer | |
| 4,170,063 | A | 10/1979 | Bettcher | |
| 4,178,683 | A | 12/1979 | Bettcher | |
| 4,198,750 | A | 4/1980 | Bettcher | |
| 4,236,531 | A | 12/1980 | McCullough | |
| 4,267,759 | A | 5/1981 | Sullivan et al. | |
| 4,326,361 | A | 4/1982 | McGill | |
| 4,336,651 | A | 6/1982 | Caro | |
| 4,363,170 | A | 12/1982 | Mcculllough | |
| 4,418,591 | A | 12/1983 | Astle | |
| 4,439,924 | A | 4/1984 | Bettcher | |
| 4,492,027 | A | 1/1985 | Bettcher | |
| 4,494,311 | A | 1/1985 | Mccullough | |
| 4,509,261 | A | 4/1985 | Bettcher | |
| 4,516,323 | A | 5/1985 | Bettcher | |
| 4,575,937 | A | 3/1986 | McCullough | |
| 4,575,938 | A | 3/1986 | McCullough | |
| 4,590,576 | A | 5/1986 | Elpiner | |
| 4,590,676 | A | 5/1986 | Bettcher | |
| 4,609,227 | A | 9/1986 | Wild et al. | |
| 4,619,047 | A | 10/1986 | Heckman | |
| 4,637,140 | A | 1/1987 | Bettcher | |
| 4,829,860 | A | 5/1989 | VanderPol | |
| 4,854,046 | A | 8/1989 | Decker et al. | |
| 4,858,321 | A | 8/1989 | Mccullough | |
| 4,865,473 | A | 9/1989 | De Vito | |
| 4,909,640 | A | 3/1990 | Nakanishi | |
| 4,942,665 | A | 7/1990 | McCullough | |
| 5,031,323 | A | 7/1991 | Honsa et al. | |
| 5,033,876 | A | 7/1991 | Kraus | |
| 5,071,264 | A | 12/1991 | Franke et al. | |
| 5,078,024 | A | 1/1992 | Cicotte et al. | |
| 5,099,721 | A | 3/1992 | Decker et al. | |
| 5,230,154 | A | 7/1993 | Decker et al. | |
| 5,331,877 | A | 7/1994 | Ishi | |
| 5,419,619 | A | 5/1995 | Lew | |
| 5,484,331 | A | 1/1996 | Buhlke | |
| 5,499,492 | A | 3/1996 | Jameson | |
| 5,522,142 | A | 6/1996 | Whited | |
| 5,529,532 | A | 6/1996 | Desrosiers | |
| 5,582,041 | A | 12/1996 | Spiess | |
| 5,664,332 | A | 9/1997 | Whited | |
| 5,692,307 | A | 12/1997 | Whited et al. | |
| 5,743,659 | A | 4/1998 | Stewart | |
| 5,749,661 | A | 5/1998 | Moller | |
| 5,761,817 | A | 6/1998 | Whited et al. | |
| 5,940,972 | A | 8/1999 | Baris et al. | |
| 5,971,413 | A | 10/1999 | El-Kassouf | |
| 6,247,847 | B1 | 6/2001 | Lob | |
| 6,354,949 | B1 | 3/2002 | Baris et al. | |
| 6,364,086 | B1 | 4/2002 | Blaurock | |
| 6,604,288 | B2 | 8/2003 | Whited et al. | |
| 6,615,494 | B2 | 9/2003 | Long et al. | |
| 6,634,257 | B2 | 10/2003 | Long et al. | |
| 6,655,033 | B2 | 12/2003 | Hermann et al. | |
| 6,662,452 | B2 | 12/2003 | Whited | |
| 6,665,940 | B2 | 12/2003 | Sanders et al. | |
| 6,694,649 | B2 | 2/2004 | Whited et al. | |
| 6,751,872 | B1 * | 6/2004 | Whited | B26B 25/002 30/340 |
| 6,769,184 | B1 * | 8/2004 | Whited | B26B 25/002 452/133 |
| 6,857,191 | B2 | 2/2005 | Whited | |
| 6,938,348 | B2 | 9/2005 | Roncaglia | |
| 6,978,548 | B2 * | 12/2005 | Whited | B26B 25/002 30/276 |
| 7,000,325 | B2 | 2/2006 | Whited | |
| 7,107,887 | B2 | 9/2006 | Whited | |
| 7,207,114 | B2 | 4/2007 | Rosu et al. | |
| 7,340,840 | B2 | 3/2008 | Whited | |
| 8,074,363 | B2 | 12/2011 | Whited | |
| 8,448,340 | B2 * | 5/2013 | Whited | B26B 25/002 452/133 |
| 8,505,207 | B2 | 8/2013 | Thien | |
| 8,661,692 | B2 | 3/2014 | Whited et al. | |
| 8,671,580 | B2 | 3/2014 | Whited | |
| 8,695,222 | B2 | 4/2014 | Whited et al. | |
| 8,726,524 | B2 * | 5/2014 | Whited | A22B 5/165 30/276 |
| 8,739,416 | B2 | 6/2014 | Mascari et al. | |
| 8,745,881 | B2 | 6/2014 | Thompson et al. | |
| 8,806,761 | B2 | 8/2014 | Whited et al. | |
| 8,893,391 | B2 | 11/2014 | Levsen | |
| 8,950,076 | B2 | 2/2015 | Whited et al. | |
| 8,968,107 | B2 | 3/2015 | Rapp et al. | |
| 9,089,980 | B2 | 7/2015 | Whited et al. | |
| 9,121,438 | B2 | 9/2015 | Mascari | |
| 9,186,171 | B2 | 11/2015 | Esarey et al. | |
| 9,211,650 | B2 | 12/2015 | Mascari et al. | |
| 9,221,183 | B2 | 12/2015 | Whited et al. | |
| 9,227,332 | B2 | 1/2016 | Thompson et al. | |
| 9,265,263 | B2 | 2/2016 | Whited et al. | |
| 9,364,962 | B2 | 6/2016 | Whited | |
| 9,452,541 | B2 | 9/2016 | Mascari et al. | |
| 9,475,203 | B2 | 10/2016 | Whited et al. | |
| 9,522,473 | B2 | 12/2016 | Mascari et al. | |
| 9,573,283 | B2 | 2/2017 | Thompson et al. | |
| 9,579,810 | B2 | 2/2017 | Mascari | |
| 9,592,076 | B2 | 3/2017 | Esarey et al. | |
| 9,623,577 | B2 | 4/2017 | Whited et al. | |
| 9,833,919 | B2 | 12/2017 | Mascari et al. | |
| 10,040,211 | B2 * | 8/2018 | Whited | A22C 17/0033 |
| 10,124,500 | B2 * | 11/2018 | Whited | B26B 25/002 |
| 10,471,614 | B2 * | 11/2019 | Whited | A22C 17/12 |
| 10,569,441 | B2 | 2/2020 | Levsen | |
| 10,786,919 | B2 | 9/2020 | Levsen | |
| 2002/0096027 | A1 | 7/2002 | Whited et al. | |
| 2003/0070301 | A1 | 4/2003 | Hermann et al. | |
| 2003/0084576 | A1 | 5/2003 | Whited et al. | |
| 2003/0131482 | A1 | 7/2003 | Long et al. | |
| 2003/0196333 | A1 | 10/2003 | Whited | |
| 2004/0134326 | A1 | 7/2004 | Long et al. | |
| 2005/0126015 | A1 | 6/2005 | Whited | |
| 2005/0178009 | A1 | 8/2005 | Whited | |
| 2005/0217119 | A1 | 10/2005 | Rapp | |
| 2006/0037200 | A1 | 2/2006 | Rosu et al. | |
| 2006/0137193 | A1 | 6/2006 | Whited | |
| 2006/0211966 | A1 | 9/2006 | Halton et al. | |
| 2007/0283573 | A1 | 12/2007 | Levsen | |
| 2007/0283574 | A1 | 12/2007 | Levsen | |
| 2008/0022537 | A1 | 1/2008 | Clarke et al. | |
| 2008/0078158 | A1 | 4/2008 | Reist | |
| 2008/0098605 | A1 | 5/2008 | Whited et al. | |
| 2009/0227192 | A1 | 9/2009 | Luthi et al. | |
| 2010/0101097 | A1 | 4/2010 | Thien | |
| 2010/0111460 | A1 | 5/2010 | Albrecht et al. | |

(56) References Cited

U.S. PATENT DOCUMENTS

| | | | |
|---|---|---|---|
| 2010/0170097 A1 | 7/2010 | Levsen | |
| 2011/0185580 A1 | 8/2011 | Whited | |
| 2011/0247220 A1 | 10/2011 | Whited et al. | |
| 2012/0011980 A1 | 1/2012 | Kroger | |
| 2012/0030952 A1 | 2/2012 | Levsen | |
| 2013/0025134 A1 | 1/2013 | Mascari et al. | |
| 2013/0025136 A1 | 1/2013 | Whited et al. | |
| 2013/0025138 A1 | 1/2013 | Whited et al. | |
| 2013/0025139 A1 | 1/2013 | Whited et al. | |
| 2013/0056324 A1 | 3/2013 | Freund | |
| 2013/0104404 A1 | 5/2013 | Levsen | |
| 2013/0185944 A1 | 7/2013 | Thompson et al. | |
| 2013/0205572 A1 | 8/2013 | Mascari | |
| 2013/0243358 A1 | 9/2013 | Stork et al. | |
| 2013/0266250 A1 | 10/2013 | Brown | |
| 2013/0326886 A1 | 12/2013 | Levsen | |
| 2014/0074118 A1 | 3/2014 | Esarey et al. | |
| 2014/0074120 A1 | 3/2014 | Esarey et al. | |
| 2015/0377289 A1 | 12/2015 | Scheidel et al. | |
| 2016/0082612 A1 | 3/2016 | Mascari et al. | |
| 2016/0279818 A1 | 9/2016 | Whited | |
| 2016/0345996 A1 | 12/2016 | Esarey et al. | |
| 2018/0162001 A1 | 6/2018 | Whited | |
| 2018/0162002 A1 | 6/2018 | Whited et al. | |
| 2019/0049042 A1 | 2/2019 | Wentworth | |
| 2021/0197414 A1 | 7/2021 | Whited et al. | |
| 2023/0053515 A1* | 2/2023 | Thompson | B26B 25/002 |

FOREIGN PATENT DOCUMENTS

| | | | |
|---|---|---|---|
| DE | 19958802 | 7/2001 | |
| EP | 0689905 | 1/1996 | |
| EP | 0816026 | 1/1998 | |
| EP | 1226907 | 7/2002 | |
| EP | 1356902 | 10/2003 | |
| EP | 1403012 | 3/2004 | |
| EP | 1527853 | 5/2005 | |
| EP | 1527854 | 5/2005 | |
| EP | 1916075 | 4/2008 | |
| EP | 2353805 | 8/2011 | |
| EP | 2497366 | 9/2012 | |
| EP | 2557935 | 6/2016 | |
| EP | 2736684 | 1/2017 | |
| FR | 1216947 | 4/1960 | |
| JP | 2000-52293 | 2/2000 | |
| WO | WO 2001/024977 | 4/2001 | |
| WO | WO 2001/41980 | 6/2001 | |
| WO | WO 2008/107490 | 9/2008 | |
| WO | WO 2011/130057 | 10/2011 | |
| WO | WO 2013/016019 | 1/2013 | |
| WO | WO 2013/016020 | 1/2013 | |
| WO | WO 2013/016021 | 1/2013 | |
| WO | WO 2013/016022 | 1/2013 | |
| WO | WO 2013/016024 | 1/2013 | |
| WO | WO 2013/016344 | 1/2013 | |
| WO | WO 2014/039601 | 3/2014 | |
| WO | WO 2014/039609 | 3/2014 | |
| WO | WO 2014/159349 | 10/2014 | |
| WO | WO 2014/160043 | 10/2014 | |
| WO | WO-2019104053 A2 * | 5/2019 | B26B 25/002 |

OTHER PUBLICATIONS

International Search Report and Written Opinion of the International Searching Authority dated Nov. 15, 2022 for PCT/US2022/040880, filed Aug. 19, 2022. PCT International Application No. PCT/US2022/040880 claims priority from the present application. (12 pages).

* cited by examiner

CAM MECHANISM FOR SPLIT BLADE HOUSING OF POWER OPERATED ROTARY KNIFE

CROSS REFERENCE TO RELATED APPLICATIONS

The following application claims priority under 35 U.S.C. § 119(e) to U.S. Provisional Patent Application Ser. No. 63/235,498, filed Aug. 20, 2021, entitled Cam Mechanism For Split Blade Housing Of Power Operated Rotary Knife. The above-identified U.S. provisional patent application is incorporated by reference herein in its entirety for any and all purposes.

TECHNICAL FIELD

The present disclosure relates to a two-position cam mechanism coupled to a split blade housing of a hand-held, power operated rotary knife, the cam mechanism movable between a first, closed position of the cam mechanism, which holds or secures the split blade housing in a first, blade-supporting position, and a second, open position of the cam mechanism, which holds or secures the split blade housing in a second, blade-changing position and, more specifically, to a two-position cam mechanism having a cam member rotatable with respect to a cam plate, the cam member being symmetric about a diagonal plane through first and second cam pins of the cam member to improve manufacturability of the cam mechanism and facilitate efficient assembly of the cam mechanism to the power operated rotary knife.

BACKGROUND

Hand-held, power operated rotary knives are widely used in meat processing facilities for meat cutting and trimming operations. Power operated rotary knives also have application in a variety of other industries where cutting and/or trimming operations need to be performed quickly and with less effort than would be the case if traditional manual cutting or trimming tools were used, e.g., long knives, scissors, nippers, etc. By way of example, power operated rotary knives may be effectively utilized for such diverse tasks as tissue harvesting or recovery, debriding/removal of skin tissue, bone tissue, tendon/ligament harvesting from human or animal tissue donors for medical purposes. Power operated rotary knives may also be used for taxidermy and for cutting and trimming of elastomeric or urethane foam for a variety of applications including vehicle seats.

Power operated rotary knives typically include a handle assembly and a head assembly attachable to the handle assembly. The head assembly includes an annular blade housing and an annular rotary knife blade supported for rotation by the blade housing. The annular rotary blade of conventional power operated rotary knives is typically rotated by a drive assembly which include a flexible shaft drive assembly extending through an opening in the handle assembly. The shaft drive assembly engages and rotates a pinion gear supported by the head assembly. The flexible shaft drive assembly includes a stationary outer sheath and a rotatable interior drive shaft which is driven by an electric motor. Alternatively, the pinion gear may be driven by a pneumatic motor mounted within the handle assembly. Gear teeth of the pinion gear engage mating gear teeth formed on an upper surface of the rotary knife blade.

Upon rotation of the pinion gear by the drive shaft of the flexible shaft drive assembly, the annular rotary blade rotates within the blade housing at a high RPM, on the order of 900-1900 RPM, depending on the structure and characteristics of the drive assembly including the motor, the shaft drive assembly, and a diameter and the number of gear teeth formed on the rotary knife blade. Power operated rotary knives are disclosed in U.S. Pat. No. 6,354,949 to Baris et al., U.S. Pat. No. 6,751,872 to Whited et al., U.S. Pat. No. 6,769,184 to Whited, U.S. Pat. No. 6,978,548 to Whited et al., U.S. Pat. No. 8,448,340 to Whited, U.S. Pat. No. 8,726,524 to Whited et al., and U.S. Pat. No. 10,040,211 to Whited, all of which are assigned to the assignee of the present application and all of which are incorporated by reference herein in their respective entireties.

Changing the annular rotary knife blade in a power operated rotary knife for purposes of resharpening the blade or inserting a replacement blade may be facilitated by employing a cam mechanism coupled to a split blade housing. The cam mechanism is coupled to a mounting section of the split blade housing and is actuatable to move the split blade housing between a first, blade supporting position wherein a blade support section of the split blade housing in an unexpanded diameter condition and a second, blade changing position wherein the blade support section of the split blade housing is in an expanded diameter position which facilitates removal of the existing blade from the housing and insertion of a sharpened blade or a replacement blade. Upon insertion of a new sharpened or replacement blade into the blade support section of the split blade housing blade, the cam mechanism is actuated to return the split blade housing to the first, blade supporting position. Examples of such a blade housing assembly including a split blade housing and a cam mechanism coupled thereto are found in U.S. Pat. No. 10,124,500 to Whited et al., issued Nov. 13, 2018, and U.S. Pat. No. 10,471,614 to Whited et al., issued Nov. 12, 2019, both of which are assigned to the assignee of the present application. Both U.S. Pat. Nos. 10,124,500 and 10,471,614 are incorporated by reference herein in their respective entireties.

SUMMARY

In one aspect, the present disclosure relates to a cam mechanism bridging a split through a mounting section of a split blade housing of a power operated rotary knife for moving the split blade housing between the first, blade supporting position and the second blade changing position, the cam mechanism comprising: a) a cam plate including a first surface and a second surface spaced apart by a side wall extending between the first and second surfaces, the cam plate including an opening extending through the first and second surfaces; and b) a cam member supported by the cam plate for rotation about a cam member axis of rotation, the cam member rotating between a first, closed position and a second, open position, the cam member including a first surface and a second surface spaced apart by a side wall, the cam member first surface including a first cam pin extending from the first surface and a second cam pin extending from the first surface, the cam member second surface including a boss extending from the second surface and received in the opening of the cam plate, the side wall of the cam member being symmetric with respect to a diagonal plane which intersects the first and second cam pins and which extends substantially parallel to the cam member axis of rotation.

In another aspect, the present disclosure relates to a cam mechanism bridging a split through a mounting section of a split blade housing of a power operated rotary knife for moving the split blade housing between the first, blade supporting position and the second blade changing position, the cam mechanism comprising: a) a cam plate including a first surface and a second surface spaced apart by a side wall extending between the first and second surfaces, the cam plate including an opening extending through the first and second surfaces; and b) a cam member supported by the cam plate for rotation about a cam member axis of rotation, the cam member rotating between a first, closed position and a second, open position, the cam member including a first surface and a second surface spaced apart by a side wall, the cam member first surface including a first cam pin extending from the first surface and a second cam pin extending from the first surface, the cam member second surface including a boss extending from the second surface and received in the opening of the cam plate, the side wall of the cam member including a first truncated region and a second truncated region, the first and second truncated regions being substantially parallel to a diagonal plane which intersects the first and second cam pins and which extends substantially parallel to the cam member axis of rotation.

In another aspect, the present disclosure relates to a blade housing assembly for supporting an annular rotary knife blade of a power operated rotary knife for rotation about a knife blade central axis of rotation, the blade housing assembly comprising: a) a split blade housing including an annular blade support section having an inner wall and a mounting section extending from the annular blade support section, the mounting section including a split extending through the mounting section and the inner wall of the blade support section, the mounting section including a first cam slot in a first portion of the mounting section on one side of the split and a second cam slot in a second portion of the mounting section on an opposite side of the split, the split blade housing being movable between a first, blade holding position and a second, blade changing position, the inner wall of the blade support section having a greater diameter in the second, blade changing position than in the first, blade supporting position; and b) a cam mechanism engaging the split blade housing for moving the split blade housing between the first, blade supporting position and the second blade changing position, the cam mechanism including: 1) a cam plate bridging the first and second portions of the mounting section of the split blade housing and including a first surface and a second surface spaced apart by a side wall extending between the first and second surfaces, the cam plate including an opening extending through the first and second surfaces; and 2) a cam member supported by the cam plate for rotation about a cam member axis of rotation, the cam member rotating between a first, closed position and a second, open position, the cam member including a first surface and a second surface spaced apart by a side wall, the cam member first surface including a first cam pin extending from the first surface and received in the first cam slot of the first portion of the split blade housing mounting section and a second cam pin extending from the first surface and received in the second cam slot in the second portion of the split blade housing mounting section, the cam member second surface including a boss extending from the second surface and received in the opening of the cam plate, the side wall of the cam member being symmetric with respect to a diagonal plane which intersects the first and second cam pins and which extends substantially parallel to the cam member axis of rotation.

In another aspect, the present disclosure relates to a power operated rotary knife comprising: a) an annular rotary knife blade rotating about a knife blade central axis of rotation; and b) a blade housing assembly including: 1) a split blade housing supporting the annular rotary knife blade for rotation about the knife blade central axis of rotation, the split blade housing including an annular blade support section having an inner wall and a mounting section extending from the annular blade support section, the mounting section including a split extending through the mounting section and the inner wall of the blade support section, the mounting section including a first cam slot in a first portion of the mounting section on one side of the split and a second cam slot in a second portion of the mounting section on an opposite side of the split, the split blade housing being movable between a first, blade holding position and a second, blade changing position, the inner wall of the blade support section having a greater diameter in the second, blade changing position than in the first, blade supporting position; and 2) a cam mechanism engaging the split blade housing for moving the split blade housing between the first, blade supporting position and the second blade changing position, the cam mechanism including: i) a cam plate bridging the first and second portions of the mounting section of the split blade housing and including a first surface and a second surface spaced apart by a side wall extending between the first and second surfaces, the cam plate including an opening extending through the first and second surfaces; and ii) a cam member supported by the cam plate for rotation about a cam member axis of rotation, the cam member rotating between a first, closed position and a second, open position, the cam member including a first surface and a second surface spaced apart by a side wall, the cam member first surface including a first cam pin extending from the first surface and received in the first cam slot of the first portion of the split blade housing mounting section and a second cam pin extending from the first surface and received in the second cam slot in the second portion of the split blade housing mounting section, the cam member second surface including a boss extending from the second surface and received in the opening of the cam plate, the side wall of the cam member being symmetric with respect to a diagonal plane which intersects the first and second cam pins and which extends substantially parallel to the cam member axis of rotation.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which.

DETAILED DESCRIPTION

Figure 1:
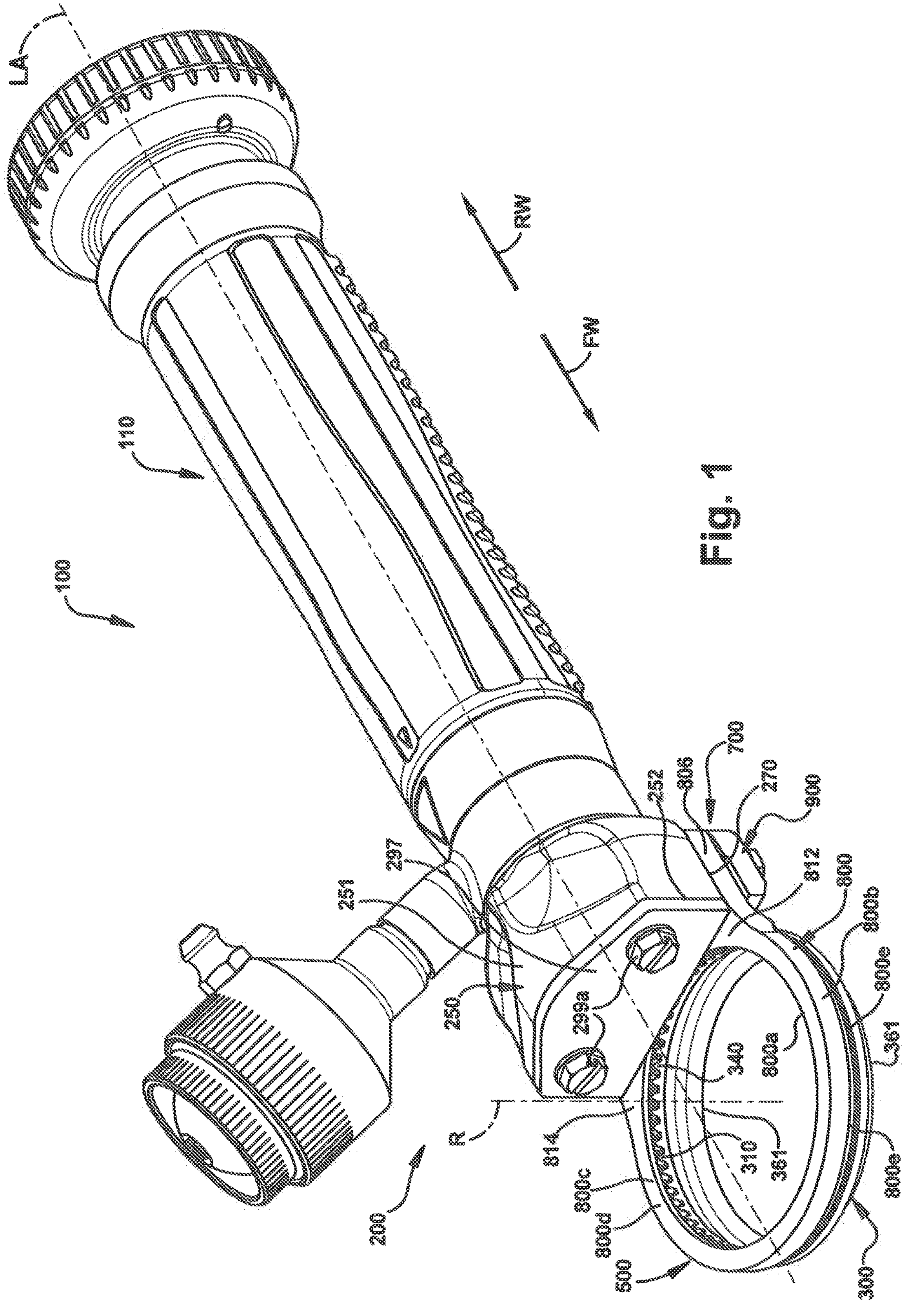
FIG. 1 is a schematic top, front perspective view of an exemplary embodiment of a power operated rotary knife of the present disclosure, including a head assembly, a handle assembly and a drive mechanism, the head assembly including a frame body, an annular rotary knife blade and a blade housing assembly supporting the annular rotary knife blade for rotation, the blade housing assembly including an annular split ring blade housing and a cam mechanism coupled to the blade housing to selectively move the blade housing between a first, blade supporting position and a second, blade changing position.

A hand-held, power operated rotary knife is schematically shown generally at 100 in FIGS. 1-5. The power operated rotary knife 100 includes a cam mechanism 900 of the present disclosure. The cam mechanism 900 is coupled to a split blade housing 800 and is movable between a first, closed position 998 which holds or secures the split blade housing 800 in a first, blade-supporting position 898, and a second, open position 999 which holds or secures the split blade housing in a second, blade-changing position 899. Advantageously, in one exemplary or example embodiment, the cam mechanism 900 includes a cam member 910 and a cam plate 950 which are configured to be both more efficient to fabricate and easier to assemble than prior cam mechanisms utilized in hand-held power operated rotary knives. Other than the cam mechanism 900 of the power operated rotary knife 100, the remaining components and assemblies of the power operated rotary knife 100 are substantially similar in configuration and function to corresponding components and assemblies of a power operated rotary knife 7000, disclosed in the aforementioned U.S. Pat. No. 10,471,614 to Whited et al., issued Nov. 12, 2019, assigned to the assignee of the present application and incorporated by reference in its entirety herein. For brevity, description of the power operated rotary knife 100 will not repeat a detailed explanation of those substantially similar components and assemblies. Instead, reference is made a description of corresponding components and assemblies in the aforementioned '614 patent and the power operated rotary knife 7000 disclosed therein. Further, materials/fabrication of components and assemblies of the power operated rotary knife 100 are similar to materials/fabrication of corresponding components and assemblies of the power operated rotary knife 7000, as described in the '614 patent.

The hand-held, power operated knife 100 extends between a distal or forward end 101 and a proximal or rearward end 102 and includes an elongated handle assembly 110, a head assembly 200, which is releasably secured to a front or distal end 112 of the handle assembly 110, and a drive mechanism 600, including a gear train 604 having a pinion gear 610. The drive mechanism pinion gear 610 is operatively coupled to and drives an annular rotary knife blade 300 of the head assembly 200 about a rotary knife blade axis of rotation R. The rotary knife blade 300 includes an upper body or upper body portion 310 and a lower blade section or lower blade portion 360 extending from the upper body 310. The upper body 310 of the rotary knife blade 300 includes a driven gear 340, comprising a set of gear teeth, and a bearing region 320, which interfaces with a corresponding bearing region 860 of a blade support section 850 of the split blade housing 850 to support the rotary knife blade 300 about the blade axis of rotation R. The lower blade section 360 of the rotary knife blade 300 includes a cutting edge 361 of the rotary knife blade 300. The handle assembly 110 includes a central through bore or throughbore 115 that extends along a central longitudinal axis LA of the handle assembly 110. The head assembly 200 extends from the handle assembly 110 along the central longitudinal axis LA in a forward or distal direction FW. The throughbore 115 of the handle assembly 110 receives a distal portion of a flexible drive shaft assembly (not shown) which operatively connects to and provides motive power to rotate the gear train 604, including the pinion gear 610 of the drive mechanism 600. As used herein, the forward direction FW will be a direction extending generally along or parallel to the handle assembly longitudinal axis toward the distal end 101 of the power operated rotary knife 100 and a rearward direction RW will be a direction extending generally along or parallel to the handle assembly longitudinal axis LA toward the proximal end 102 of the power operated rotary knife 100. An upward direction UP will be a direction orthogonal to the forward and rearward directions FW, RW and in the direction shown in FIGS. 4 and 5 and a downward direction DW will be in a direction opposite to the upward direction UP.

The pinion gear 610 of the drive mechanism 600 is driven for rotation about a pinion gear axis of rotation PGR and engages and drives the annular rotary knife blade 300 about the rotary knife blade axis of rotation R. In addition to the annular rotary knife blade 300, the head assembly 200 of the power operated rotary knife 100 includes a frame body 250 and a blade housing assembly 700. The blade housing assembly 700 includes a split blade housing 800 supporting the annular rotary knife blade 300 for rotation about its axis of rotation R. The cam mechanism or cam assembly 900 of the present disclosure is affixed to the frame body 250 and engages the split blade housing 800 and, in the first, locked, closed position 998 of the cam mechanism 900, secures the split blade housing 800 in the first, blade-supporting position 898, characterized by a first, unexpanded or blade supporting blade housing diameter BHD1 (FIGS. 24, 26 and 27), and, in the second, unlocked, open position 899 of the cam mechanism 900, secures the split blade housing 800, a second, open position 999 which holds or secures the split blade housing in a second, blade-changing position 899 characterized by a second, expanded or blade changing blade housing diameter BHD2 (FIG. 25). The frame body 250 includes a mounting pedestal 272 and the cam mechanism 900 secures the split blade housing 800 to the frame body mounting pedestal 272. The cam mechanism 900, and specifically the cam member 950, is rotatable or movable between the first, closed, locked or home position 998 of the cam mechanism 900 which secures the blade housing 800 in the first, blade supporting position 898 and the second, open, unlocked or expanded position 999 of the cam mechanism 900 which secures the blade housing 800 in the second, blade changing position 899.

The split blade housing 800 includes: a) an annular blade support section 850, which supports the rotary knife blade 300 for rotation about the rotary knife blade axis of rotation R, and b) a mounting section 802, which may be considered as a tongue or projection extending radially outwardly and generally in the rearward direction RW from the annular blade support section 850. The cam mechanism 900 includes: a) the stationary cam plate 950, securing the mounting section 802 of the split blade housing 800 to the mounting pedestal 272 of the frame body 250, and b) the rotatable cam member 910, which engages the split blade housing mounting section 802 to move the split blade housing 800 between the first blade supporting position 898 and the second blade changing position 899 as the cam member 910 is rotated between the first closed position 998 and the second open position 999.

In addition to the mounting pedestal 272, the frame body 250 of the head assembly 200 includes a forward portion 251 and a rearward portion 280. The rearward portion 280 of the frame body 250 includes an annular boss 282 that defines a mounting structure that receives and engages the front end 112 of the handle assembly 110 to secure the head assembly 200 to the handle assembly 110. The head assembly 200 further includes the blade housing assembly 700 including the split ring blade housing or split blade housing 800 which supports the annular rotary knife blade 300 for rotation about the knife blade central axis of rotation R and the cam assembly or cam mechanism 900 which is affixed to the split blade housing 800. The annular blade support section 850 of the split blade housing 800 is centered about a blade housing center line or central axis CBH, specifically, an inner wall 852 of the blade support section 850, which defines the annular bearing region 860 of the blade housing 800 for rotatably supporting the annular rotary knife blade 300, is centered about the blade housing center line CBH. The blade housing center line CBH is substantially parallel to the central axis of rotation R of the rotary knife blade 300 and, in a first, blade supporting position 898 of the blade housing 800, the blade housing center line CBH is substantially coincident with the rotary knife blade central axis of rotation R.

Figure 6:
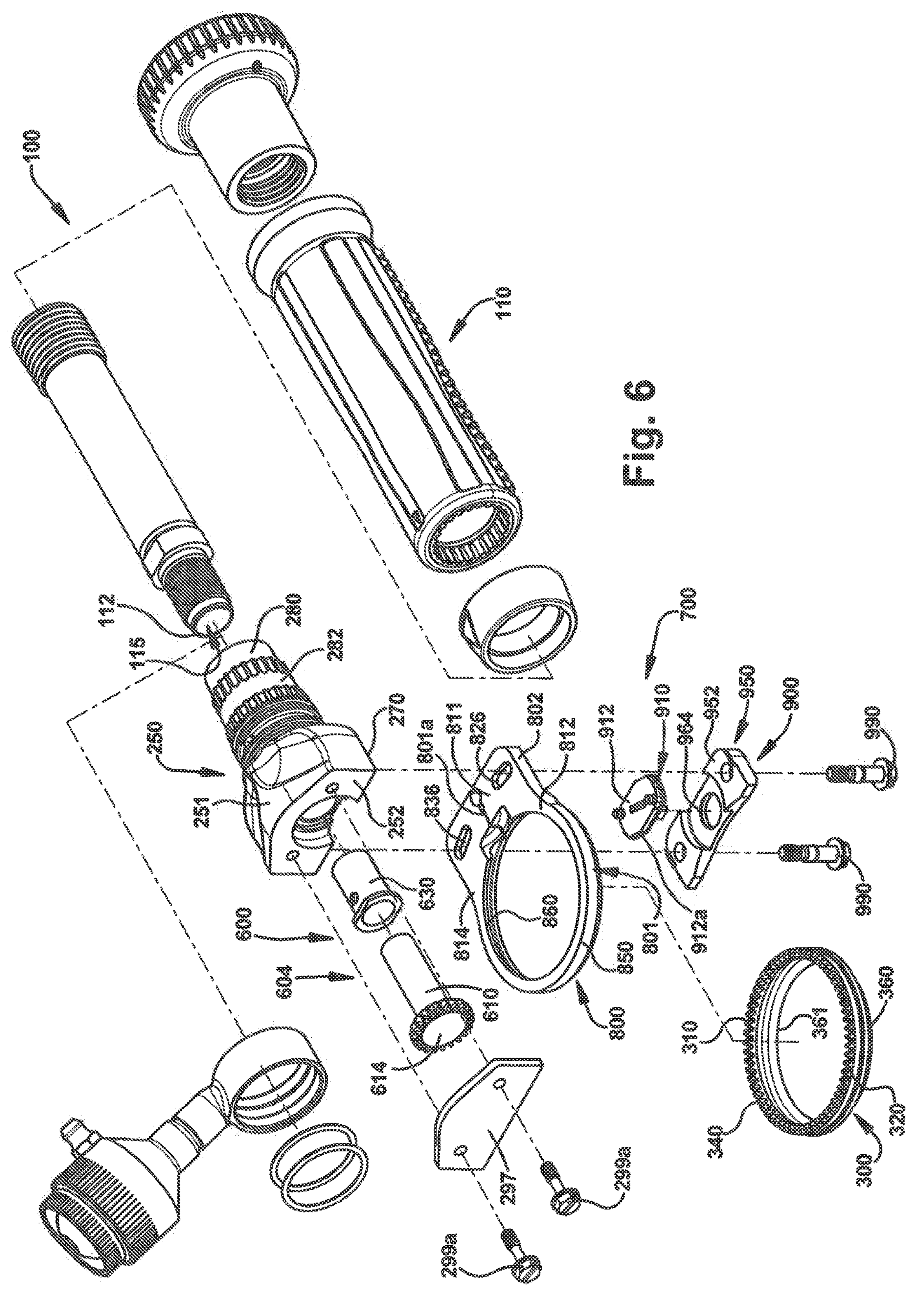
FIG. 6 is a schematic exploded, top, front perspective view of the power operated rotary knife of FIG. 1.
Figure 24:
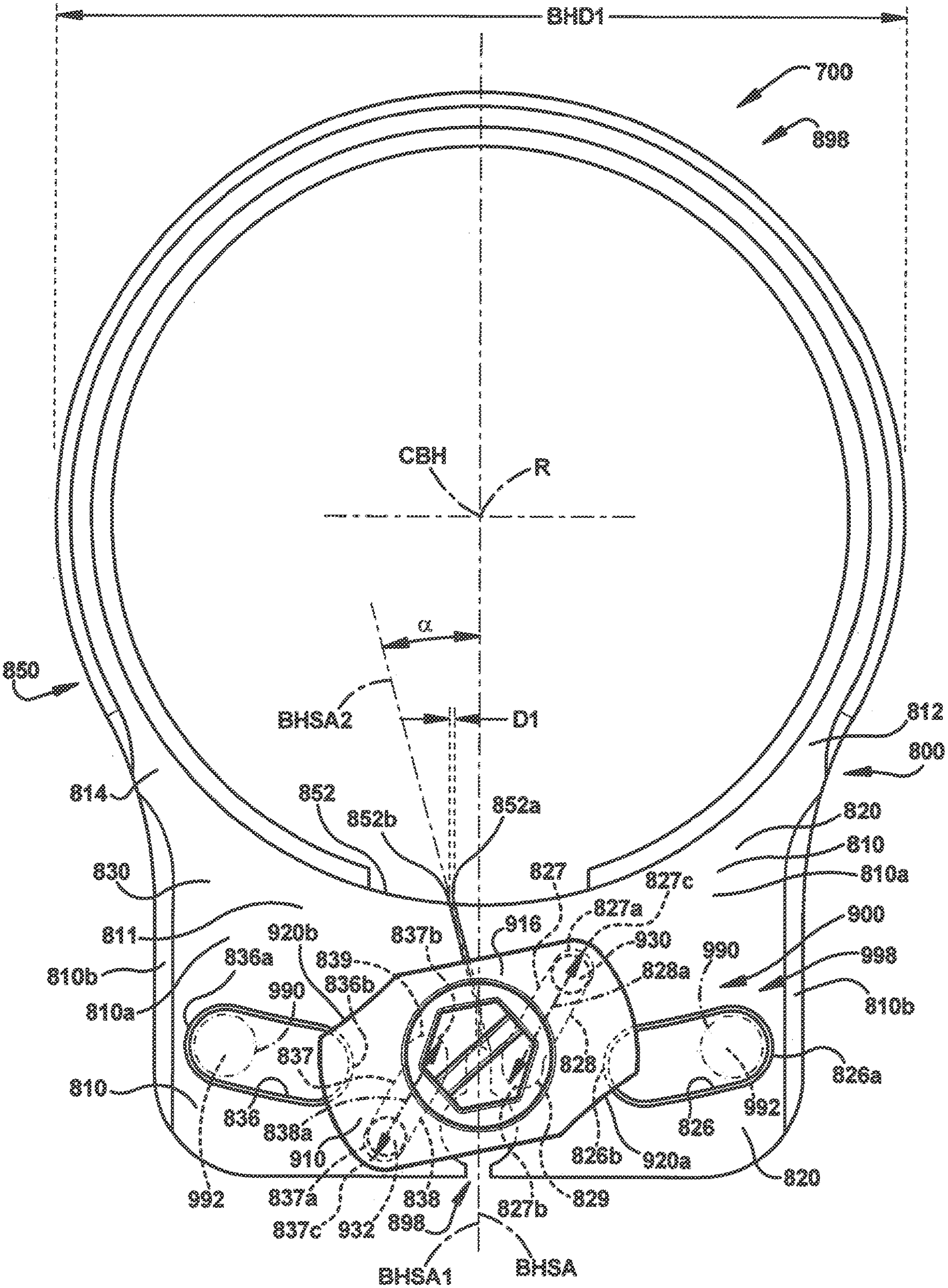
FIG. 24 is a schematic bottom plan view of the blade housing assembly of the power operated rotary knife of FIG. 1, with the cam mechanism in the first, closed or locked position and the annular split ring blade housing in the first, blade supporting position.
Figure 25:
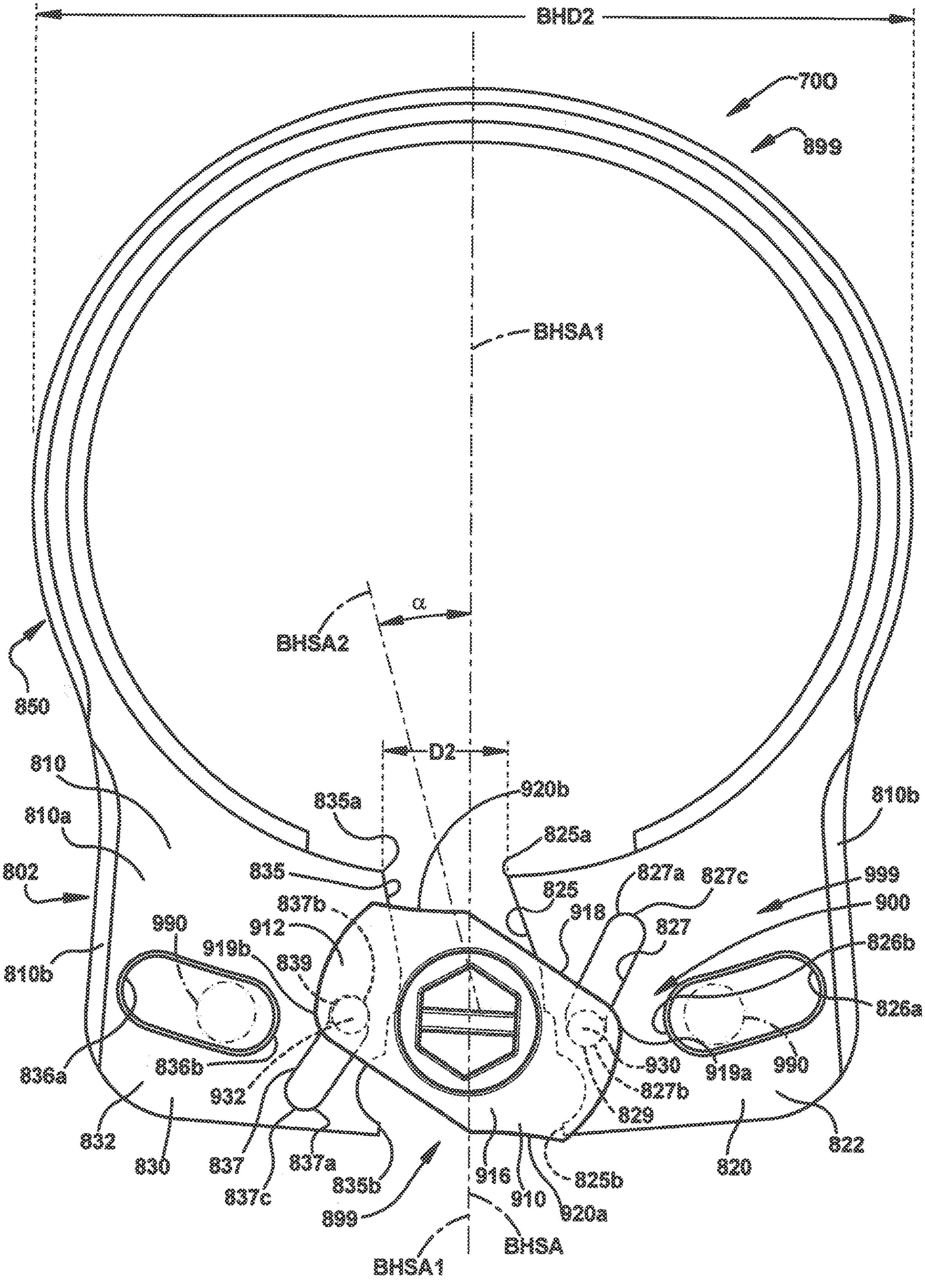
FIG. 25 is a schematic bottom plan view of the blade housing assembly of the power operated rotary knife of FIG. 1, with the cam mechanism in the second, open or unlocked position and the annular split ring blade housing in the second, blade changing position.

As best seen in FIGS. 6, 24 and 25, the blade housing 800 is referred to as a split ring 801 because a split 801*a* extends through a diameter of the split ring blade housing 800 in a region of the blade housing mounting section 802 to allow for expansion of a circumference of the annular blade support section 850 for purposes of removing the annular rotary knife blade 300 from the annular blade support section 850 and inserting a replacement or resharpened annular rotary knife blade 300 into the annular blade support section 850. With respect to the mounting section 802, the split 801*a* extends through and divides a central region 811 of the mounting section 802 defining a first body section or portion 820 on one side of the split 801*a* and a second body section or portion 830 on an opposite side of the split 801*a*. In the region of the mounting section 802, an inner wall 804 of the mounting section 802 overlaps and is coincident with the inner wall 852 of the blade support section 850 of the split blade housing 800. In one exemplary embodiment, the split 801*a* of the mounting section 802 of the blade housing 800, when viewed in top (or bottom) plan view, is a generally dog-leg shaped split having a first, radially extending split portion 801*b* and a second, angled split portion 801*c*, which extends from but is transverse to the first, radially extending split portion 801*b*. Thus, when viewed in plan view, while the split 801*a* bisects the mounting section 802, the resulting first and second body portions 820, 830 are different in shape and size.

In the first, closed, locked or home position 998 of the cam mechanism 900 (shown schematically in FIG. 24), the cam mechanism 900 positions or secures the blade housing 800 in the first, blade supporting position 898, characterized by a first, unexpanded or blade supporting blade housing diameter BHD1 (depicted schematically in FIG. 24), and, in a second, open, unlocked or open position 999 of the cam mechanism 900 (shown schematically in FIG. 25), the cam mechanism 900 positions or secures the blade housing 800 in a second, blade changing position 899, characterized by a second, expanded blade housing diameter BHD2 (depicted schematically in FIG. 25). In the first, blade supporting position 898, as measured at the inner wall 852 of the blade support section 850 adjacent the split 801*a*, there is a first width or split distance D1 (FIG. 24) between opposing faces

825, 835 of the first body portion 820 and the second body portion 830 of the central region 811 of the mounting section 802. In the second, blade changing support position, as measured at the inner wall 852 of the blade support section 850, there is a second width or split distance D2 (FIG. 25) between opposing faces 825, 835 of the first body portion 820 and the second body portion 830 of the central region 811 of the mounting section 802, the second split distance D2 being greater than the first split distance D1.

Frame Body 250

The frame body 250 of the head assembly 200 of the power operated rotary knife 100 includes the forward or distal portion 251, which supports the blade housing assembly 700, and the rearward or proximal portion 280, extending in the rearward direction RW toward the handle assembly 110. The forward portion 251 of the frame body 250 includes the mounting pedestal 272 of the lower surface 270 which, as explained previously, functions as a mounting surface for the blade housing mounting section 802 and includes the pair of threaded openings 274 that receive respective ones of a pair of threaded fasteners 990 of the cam mechanism 900 thereby urging the cam plate 950 against the planar lower surface 810*a* of the lower end 810 of the mounting section 802. This secures the blade housing mounting section 802 to the mounting pedestal 272 of the frame body 250 and thereby secures a blade—blade housing combination 500, including annular rotary knife blade 300 and the blade housing assembly 700, including the split blade housing 800 and the cam mechanism 900, to the frame body 250. The forward portion 251 of the frame body 250 additionally receives and removably supports a pinion gear shield 297. The pinion gear shield 297 helps locate the pinion gear 610 and the sleeve bushing 630 of the drive mechanism 600 such that the pinion gear 610 operatively engages a driven gear of the annular rotary knife blade 300 to rotate the knife blade 300 with respect to the blade housing 800 about the axis of rotation R in a gear meshing region. The pinion gear shield 297 is secured to a planar mounting surface of a forward wall 252 of the forward portion 251 of the frame body 250 by a pair of threaded fasteners 299*a*.

To improve and facilitate alignment during the assembly of the blade—blade housing combination 500 to the planar mounting pedestal 272, in one exemplary or example embodiment, the mounting pedestal 272 includes a generally cylindrical post or cylindrical boss 273 extending orthogonally from a planar extent of the mounting pedestal 272. The cylindrical boss 273 includes a generally cylindrical side wall or outer surface 273*a*. In one example or exemplary embodiment, for manufacturability purposes, the cylindrical side or outer surface 273*a* is truncated to have a flat outer surface facing in the rearward RW direction. The cylindrical boss or post 273 is advantageously received in the cylindrical opening 801*d* in the first, rearward radial split portion 801*b* of the blade housing expansion split 801*a* in the mounting section 802 of the split blade housing 800. The cylindrical opening 801*d* is disposed between half-cylindrical portions or regions 825*c*, 835*c* of facing surfaces 825, 835 of the first and second body portions 820, 830 adjacent the rearward end portions 825*b*, 835*b* of the facing surfaces 825, 835 and the outer wall 806 of the mounting section 802. The half cylinder portions or regions 825*c*, 835*c* of the facing surfaces 825, 835 define a cylindrical opening 801*d* of the mounting section 802 of the blade housing 800. Interfit of the frame body cylindrical boss 273 and the cylindrical opening 801*d* defined by the half cylinder regions 825*c*, 835*c* of the facing surfaces 825, 835 of the mounting section 802 of the blade housing 800 facilitates proper alignment of the mounting section 802 of the blade housing 800 with respect to the frame body mounting pedestal 272 during assembly of the assembled blade—blade housing combination 500 to the frame body 250. Additionally, the generally cylindrical side wall 273*a* of the frame body boss 273 advantageously provides for proper circumferential alignment for the first and second body portions 720, 830 of the mounting section 802 of the blade housing 800, including proper circumferential misalignment of the forward end portions 825*a*, 835*a* of the facing surfaces 825, 835 at the inner wall 804 of the mounting section 802, which define a portion of the annular bearing region 860 of the blade support section 850 of the blade housing 800. Proper alignment of the facing surfaces 825, 835 at the inner wall 804 is important to provide a uniform, smooth, annular bearing region 860 to support rotation of the rotary knife blade 300 about its axis of rotation R, without nonuniformities, steps or discontinuities in the bearing region 860 that would result from misalignment of the facing surfaces 825, 835 at the inner wall 804. Misalignment of the facing surfaces 825, 835 at the inner wall 804 resulting in nonuniformities, steps or discontinuities in the bearing region 860 of the blade support section 850 of the blade housing 800 could result in pinching of and/or excessive wearing of the corresponding bearing region 320 of the rotary knife blade 300. Adjacent to and extending orthogonally with respect to the planar mounting pedestal 272 of the frame body 250 is the planar side wall 272*a*, which aids in alignment due to matching planar configurations of the planar distal portion 807 of the outer wall 806 of the blade housing mounting section 802.

Blade Housing 800

In one exemplary or example embodiment, the blade housing assembly 700 of the head assembly 200 of the power operated rotary knife 100 includes the split ring blade housing 800 and the cam mechanism 900 which functions to move the blade housing 800 between the first, blade supporting position 898 to the second, blade changing position 899, as previously described.

The mounting section 802 of the blade housing 800 includes the split 801*a* of the mounting section 802, when viewed in plan view, a dog-leg shaped split. The split 801*a* includes the first, rearward radially extending split portion 801*b*, extending along a first blade split axis BHSA1, and the second, forward extending angled split portion 801*c*, extending along a second angled split axis BHSA2. The first split portion 801*b* extends along the first blade housing split axis BHSA1, which can be viewed as a radius line RL (FIG. 26) extending orthogonally from the blade housing center line CBH. The first blade housing split axis BHSA1 extends along and is centered between opposing faces 825, 835 of the first and second body portions 820, 830 of the blade housing mounting section 802. The first blade housing split axis BHSA1 intersects and is orthogonal to the blade housing center line CBH. The first radial split axis BHSA1 of the first split portion 801*b* intersects the inner wall 852 of the blade support section 850 at an intersection position or location. The first blade housing split axis BHSA1 and the second blade housing split axis BHSA2 are, in reality, planes (as opposed to axis lines) that extends between opposing faces 825, 835 of the first and second body portions 820, 830 of the blade housing mounting section 802. That is, the first split portion 801*b* may be considered as extending along a vertically extending, longitudinal plane of the blade housing 800 that bisects the blade housing 800 and specifically the central region 811 of the blade housing mounting section

802 and that intersects and is parallel to the blade housing center line CBH, while the second split portion 801*c* may be considered as extending along a vertically extending plane that intersects and is transverse to a vertically extending, longitudinal plane of the blade housing 800 and is parallel to the blade housing center line CBH. However, for sake of simplicity, reference will be made to the first and second blade housing split axes BHSA1, BHSA2.

A distal end of the first split portion 801*b* and a proximal end of the second split portion 801*c* are connected by a short, angled transition region. Accordingly, the blade housing split 801 may be viewed as extending along and centered about a blade housing split axis BHSA. The blade housing split axis BHSA is comprised of two intersecting axes BHSA1, BHSA2. As can be seen in FIG. 24, an acute angle alpha α is formed between the first split axis BHSA1 of the first rearward radially extending blade housing split portion 801*b* of the split 801*a* and the second split axis BHSA2 of the second forward angled blade housing split portion 801*c* of the split 801*a*. In one exemplary embodiment, when viewed in plan view, e.g. FIG. 24, the angle alpha α is approximately 15°.

In the blade housing 800, a termination location 801*e* of the split 801*a* at the inner wall 852 of the blade support section 850 is circumferentially offset from an intersection position 801*f* of the first blade housing split axis BHSA1 at the inner wall 852 of the blade support section 850. The termination location or position 801*e* of the split 801*a* corresponds to the position of circumferential ends 852*a*, 852*b* of the inner wall 852 of the blade support section 850. When the blade housing 800 is in the first, blade supporting position 898, the split distance at the termination position 801*e* between the circumferential ends 852*a*, 852*b* of the inner wall 852 of the blade support section 850 (and similarly between the forward end portions 825*a*, 835*a* of the facing surfaces 825, 835) is split distance D1 and when the blade housing 800 is in the second, blade changing position 899, the split distance at the termination position 801*e* between the circumferential ends 852*a*, 852*b* of the inner wall 852 of the blade support section 850 is split distance D2. Stated another way, in the first, blade supporting position 898, the split width or split distance at the termination position 801*e* between the forward end portions 825*a*, 835*a* of the facing surfaces 825, 835 is split distance D1 and in the second, blade changing position 899, the split distance at the termination position 801*e* between the forward end portions 825*a*, 835*a* of the facing surfaces 825, 835 is split distance D2.

Advantageously, the circumferential offset of the termination location 801*e* of the split 801*a* from the intersection position 801*f* defined by the first blade housing split axis BHSA1 with respect to the inner wall 852 of the blade support section 850 mitigates the potential migration of debris from cutting and trimming operations into a gear meshing region 817 where a gear head 614 of the pinion gear 610 meshes with the driven gear 340 of the body rotary knife blade 300. Collecting debris materials in the region 817 of the meshing of the pinion gear 610 and the driven gear 340 of the rotary knife blade 300 is undesirable because the heat generated by the driving engagement tends to "cook" the debris creating a sticky build-up on the pinion gear gear head 614 and the driven gear 340 of the rotary knife blade 300. Such a build-up of debris may lead to increased vibration of the power operated rotary knife 100 during operation and shorten rotary knife blade 300 and pinion gear life, all of which are detrimental to rotary knife performance. Stated another way, the termination position 801*e* of the split 801*a* is advantageously: a) circumferentially offset from the region of meshing 817 of the pinion gear 610 and the driven gear 340 of the rotary knife blade 300; b) circumferentially offset from the intersection location 801*f* defined by the first blade housing split axis BHSA1 of the first split portion 801*b* of the split 801*a* where the first blade housing split axis BHSA1 intersects the inner wall 852 of the blade support section 850 and the inner wall 804 of the mounting section 802; c) when viewed in plan view, offset from a radius line RL (shown schematically in FIG. 26) which bisects the pinion gear recess 815; and d) when viewed in plan view, offset from the handle assembly longitudinal axis LA and an axis of rotation PGR (FIGS. 3 and 5) of the pinion gear 610.

As best seen in FIGS. 2-5, the cam mechanism 900 secures blade housing mounting section 802 of the assembled blade—blade housing combination 500 to the frame body mounting pedestal 272 via the pair of threaded fasteners 990 which extend through cam plate openings 982*a*, 882*b* and thread into respective threaded openings 274 of lower surface 270 of forward portion 251 of the frame body 250. The pair of fasteners 990 pass through mounting slots 826, 836 of first and second body portions 820, 830 of the mounting section 802 of the blade housing 800. Essentially, the blade housing mounting section 802 is sandwiched between the cam mechanism cam plate 950 and the frame body mounting pedestal 272. Additionally, as can best be seen in FIG. 7, a rearward section of the first split portion 801*b* includes the cavity or cylindrical opening 801*d* adjacent the outer wall 806 of the mounting portion or section 802. The cylindrical opening 801*d* receives the cylindrical post or cylindrical boss 273 extending orthogonally downwardly from a planar extent of the mounting pedestal 272 of the lower surface 270 of the forward portion 251 of the frame body 250 when the assembled blade—blade housing combination 500 is secured to the frame body 250.

The cylindrical opening 801*d* is adjacent the outer wall 806 of the mounting portion or section 802 and is formed in part by rearward end portions 825*b*, 835*b* of the facing surfaces 825, 835 at the outer wall 806. The facing surface 825 for the first body portion 820 includes the half cylinder region 825*c* and the facing surface 835 of the second body portion 830 includes the corresponding aligned half cylinder region 835*c*, which taken together, form the cylindrical opening 801*d*. The cylindrical opening 801*d* extends between and through the upper and lower ends 808, 810 of the mounting section 802 and a central axis CACO (FIG. 26) of the cylindrical opening 801*d* intersects the first blade housing split axis BHSA1 and is substantially parallel to the blade housing center line CBH. Advantageously, as previously explained, the interfit of the frame body cylindrical boss 273 and the cylindrical opening 801*d* during assembly of the assembled blade—blade housing combination 500 to the frame body 250 insures proper alignment of the mounting section 802 of the blade housing 800 with respect to the frame body mounting pedestal 272. Additionally, a cylindrical side wall 273*a* of the frame body boss 273 advantageously provides for proper circumferential alignment for the first and second body portions 720, 830 of the mounting section 802 as the assembled blade—blade housing combination 500 is secured to the frame body 250 via the pair of threaded fasteners 990. That is, the cylindrical side wall 273*a* abuts both of the opposing half cylinder regions 825*c*, 835*c* of the facing surfaces 825, 835 of the first and second body portion 820, 830 thereby reducing a possibility of circumferential misalignment of the forward end portions 825*a*, 835*a* of the facing surfaces 825, 835 at the inner wall 804 of the mounting section 802.

Figure 2:
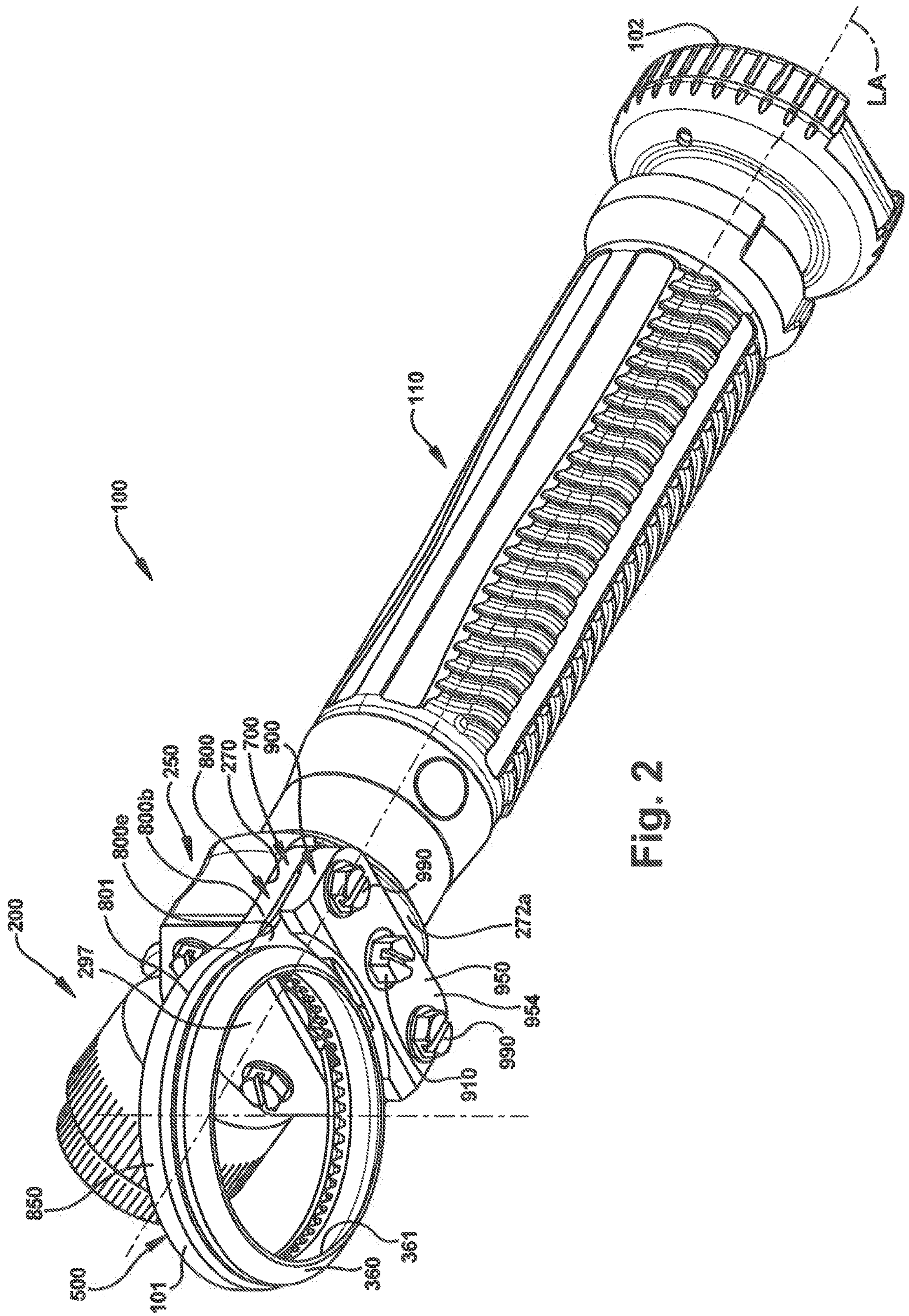
FIG. 2 is a schematic bottom, front perspective view of the power operated rotary knife of FIG. 1.
Figure 3:
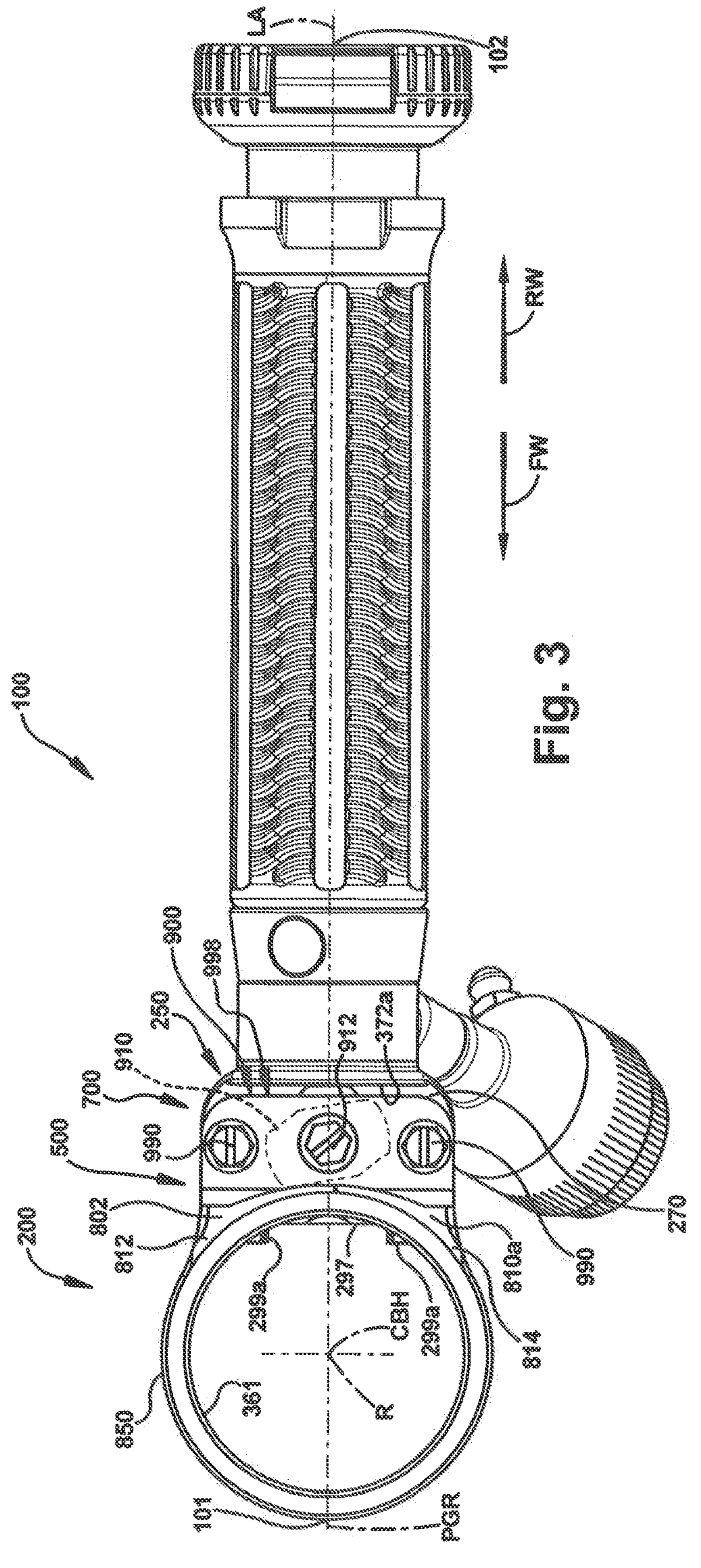
FIG. 3 is a schematic bottom plan view of the power operated rotary knife of FIG. 1.
Figure 4:
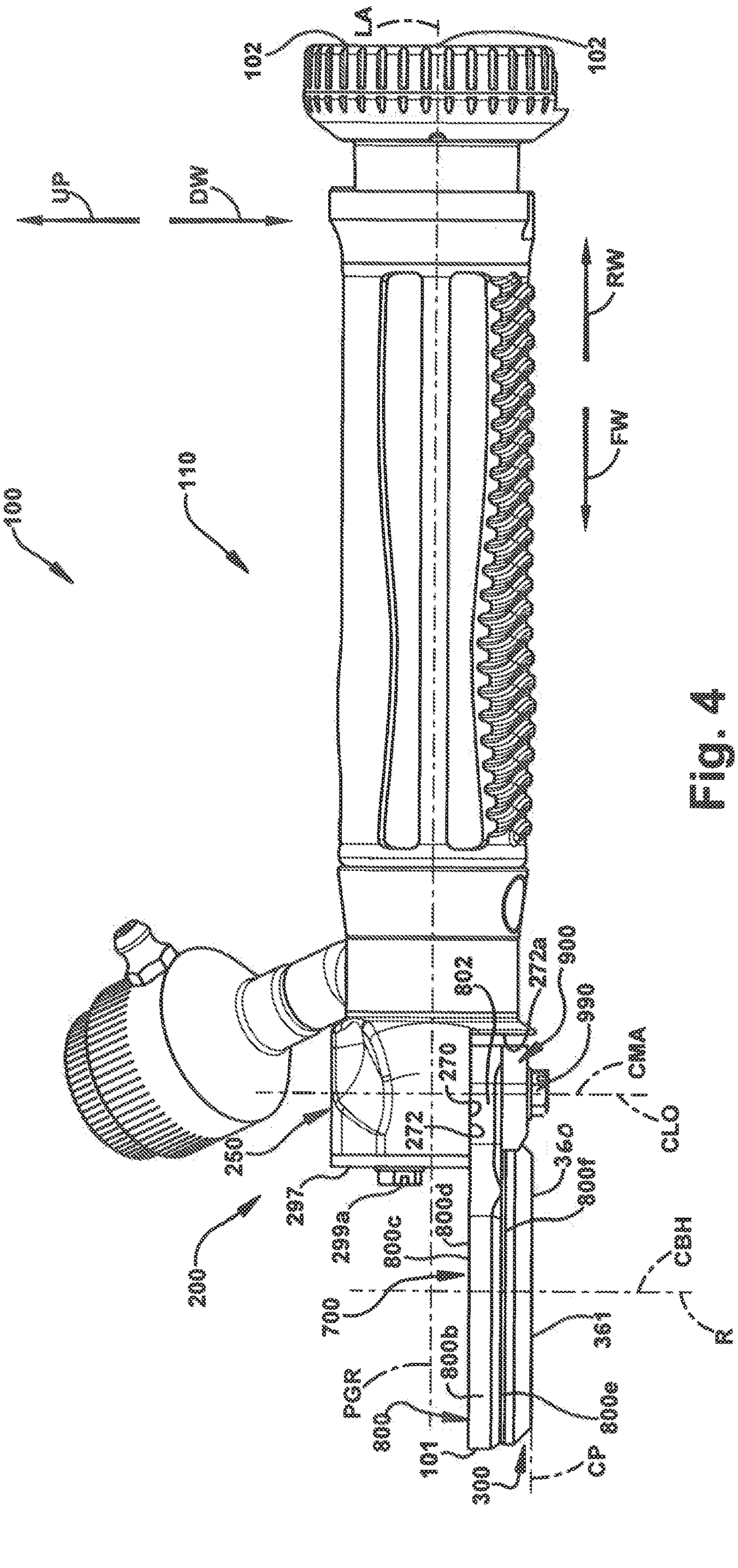
FIG. 4 is a schematic side elevation view of the power operated rotary knife of FIG. 1.

Moreover, as can best be seen in FIG. 24, a pair of longitudinally extending chamfered or angled recessed portions 810*b* bridge the lower surface 810*a* and the outer wall 806 of the mounting section 802. The first body portion 820 of the mounting section 802 includes one of the pair of angled recessed portions 810*b*, while the second body portion 830 includes the second of the pair of angled recessed portions 810*b*. The pair of angled recessed portions 810*b* of the mounting section 802 interfit with and receive axially upwardly extending edges 984*a*, 984*b* of an upper surface 952 of the cam plate 950 (best seen in FIGS. 10, 12 and 14). As can be seen in FIG. 2, the interfitting of the upwardly extending edges 984*a*, 984*b* of the upper surface 952 of the cam plate 950 into respective ones of the pair of angled portions 810*b* of the blade housing mounting section 802 insures proper alignment of the mounting section 802 of the blade housing 800 and the cam plate 950, further facilitates proper alignment of the mounting section 802 of the blade housing 800 with respect to the frame body mounting pedestal 272 and further mitigates the possibility of circumferential misalignment of the forward end portions 825*a*, 835*a* of the facing surfaces 825, 835 at the inner wall 804 of the mounting section 802.

An additional visual aid to proper alignment of the mounting section 802 of the blade housing 800 with respect to the frame body mounting pedestal 272 results from the matching planar configurations a planar rearward or distal portion 807 of the outer wall 806 of the blade housing mounting section 802 and the planar side wall 272*a* (FIG. 7) adjacent to and extending orthogonally with respect to the planar mounting pedestal 272 of the frame body 250. During assembly, proper orientation of the assembled blade—blade housing combination 500 with respect to the frame body mounting pedestal 272 can be easily ascertained by viewing the orientation and position of the distal portion 807 of the outer wall 806 of the blade housing mounting section 802 with respect to the respect to the planar side wall 272*a* of the frame body 250 adjacent the mounting pedestal 272.

The mounting section 802 of the blade housing 800 includes the inner wall 804, which overlaps and is coincident with the inner wall 852 of the blade support section 850 and comprises and corresponds to a portion of an inner wall 800*a* of the blade housing 800, and a radially spaced apart outer wall 806, which defines a portion of an outer wall 800*b* of the blade housing 800, and the upper end 808, which defines a portion of an upper end 800*c* of the blade housing 800, and an axially spaced apart lower end 810, which defines a portion of a lower end 800*e* of the blade housing 800. The upper end 808 of the mounting section 802 defines the generally planar upper surface 808*a*. An upper end 856 (defining an upper planar surface 856*a*) of the blade support section 850 and the upper end 808 (defining the upper planar surface 808*a*) of the mounting section 802 are advantageously coplanar with and together form the planar upper surface 800*d* of the blade housing 800. As noted above, the first arcuate recess 815 is formed in the planar upper surface 808*a* of the upper end 708 adjacent the inner wall 800*a* of the blade housing 800. The first arcuate recess 815 provides clearance for the gear head 614 of the pinion gear 610 such that the pinion gear head 614 is positioned to engage the mating driven gear 340 of the rotary knife blade 300. The sleeve bushing 630, in turn, supports the pinion gear 610 for rotation about the pinion gear axis of rotation PGR.

The first body portion 720 of the blade housing central region 811 includes a generally planar upper surface 821, an axially spaced apart, generally planar lower surface 822. Because the split 801*a* has a dog-leg configuration when viewed in plan view because of the second forwardly extending angled split portion 801*c*, the first body portion 820 is larger than the second body portion 830 and the first and second body portions 820, 830 are not symmetric about the split 801*a*. The first body portion 820 also includes an inner surface 823 forming part of: a) the inner wall 800*a* of the blade housing 800; b) the inner wall 804 of the mounting section 802; and c) the coincident inner wall 852 of the blade support section 850, and an outer surface 824 forming part of: a) the outer wall 800*b* of the blade housing 800; and b) the outer wall 806 of the mounting section 802. The second body portion 830 of the blade housing central region 811 includes a generally planar upper surface 831, an axially spaced apart, generally planar lower surface 832. The second body portion 830 also includes an inner surface 833 forming part of: a) the inner wall 800*a* of the blade housing 800; b) the inner wall 804 of the mounting section 802; and c) the coincident inner wall 852 of the blade support section 850, and an outer surface 834 forming part of: a) the outer wall 800*b* of the blade housing 800; and b) the outer wall 806 of the mounting section 802.

Figure 8:
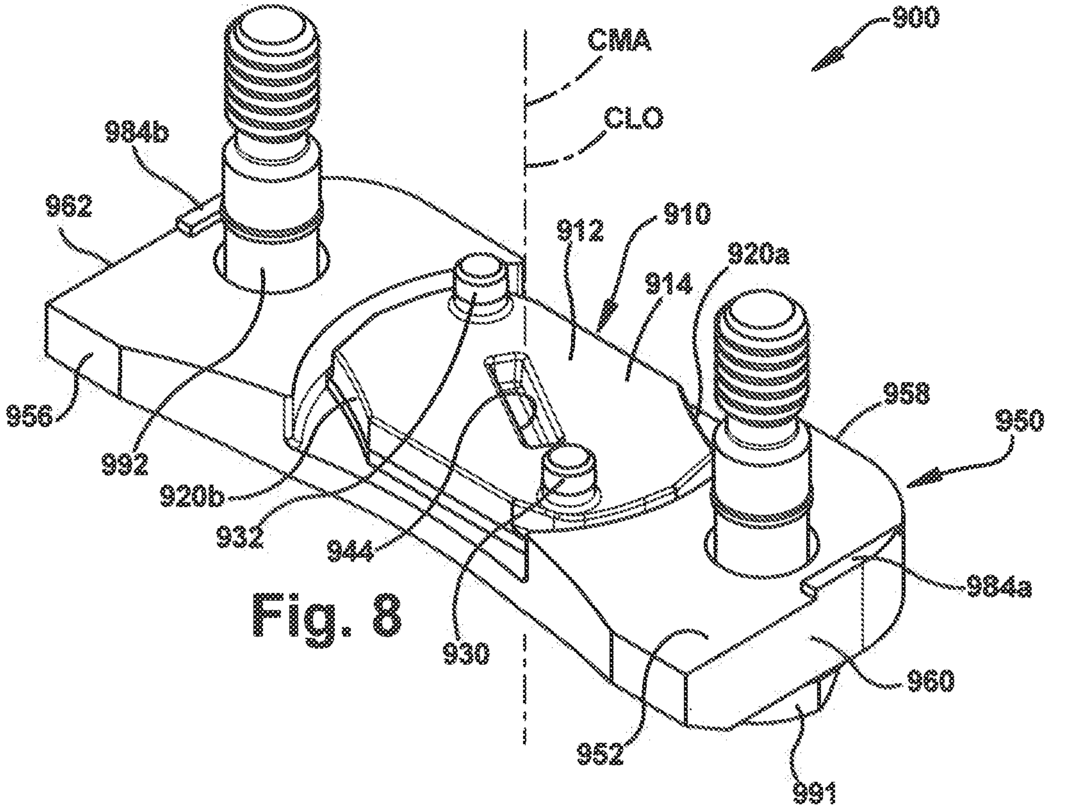
FIG. 8 is a schematic top, front perspective view of the cam mechanism of the head assembly of the power operated rotary knife of FIG. 1, with the cam mechanism in a first, closed or locked position.
Figure 9:
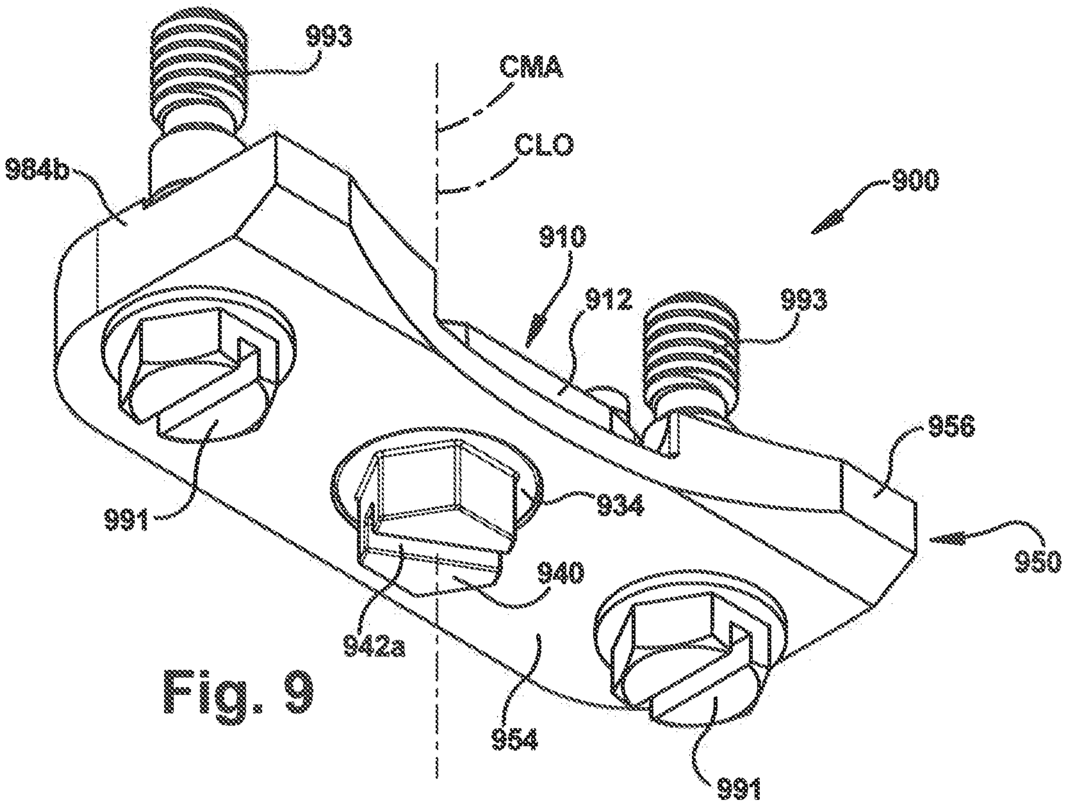
FIG. 9 is a schematic bottom, front perspective view of the cam mechanism of FIG. 8, with the cam mechanism in the first, closed or locked position.
Figure 26:
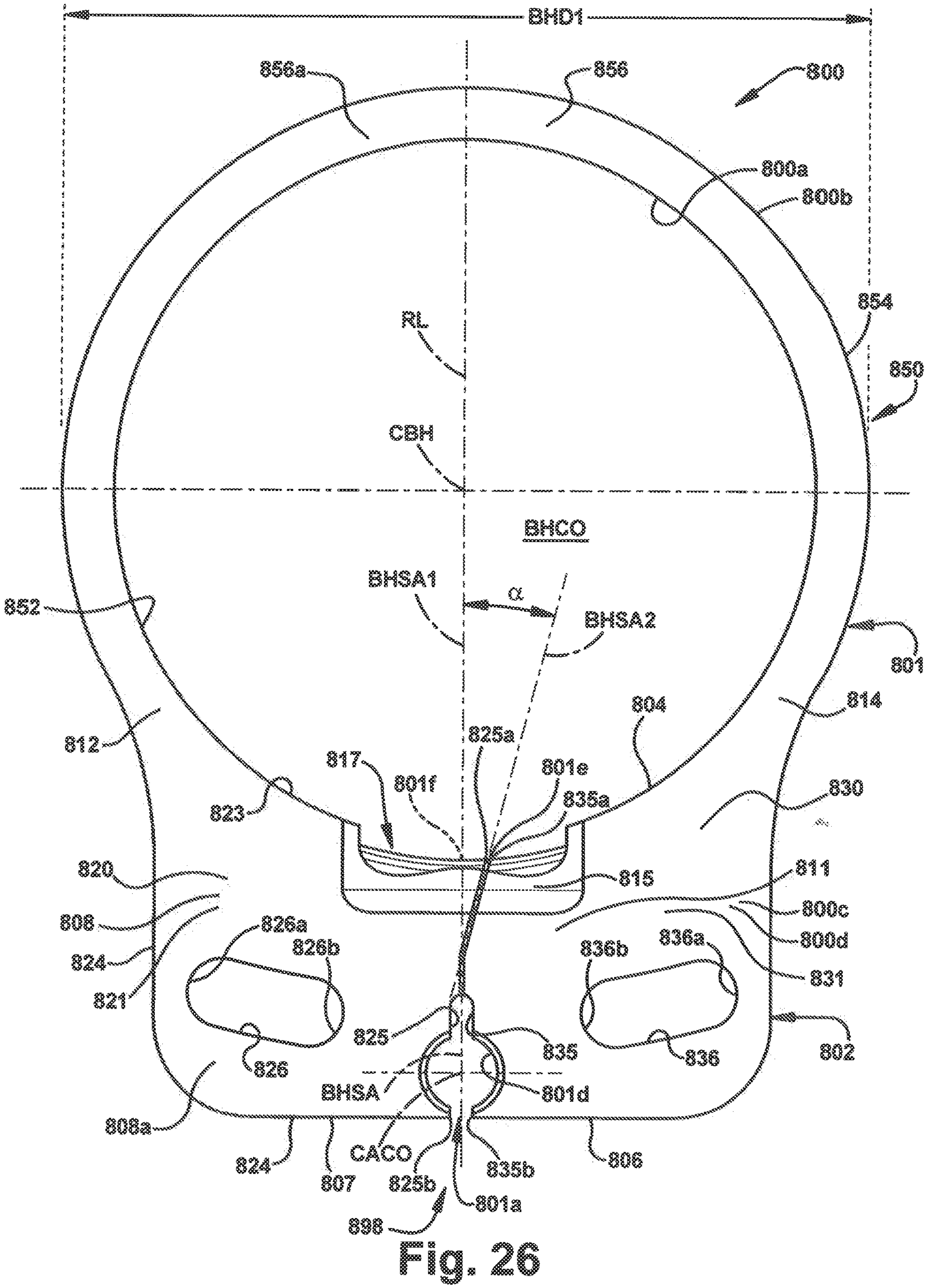
FIG. 26 is a schematic top plan view of the annular split ring blade housing of the blade housing assembly of the head assembly of the power operated rotary knife of FIG. 1.
Figure 27:
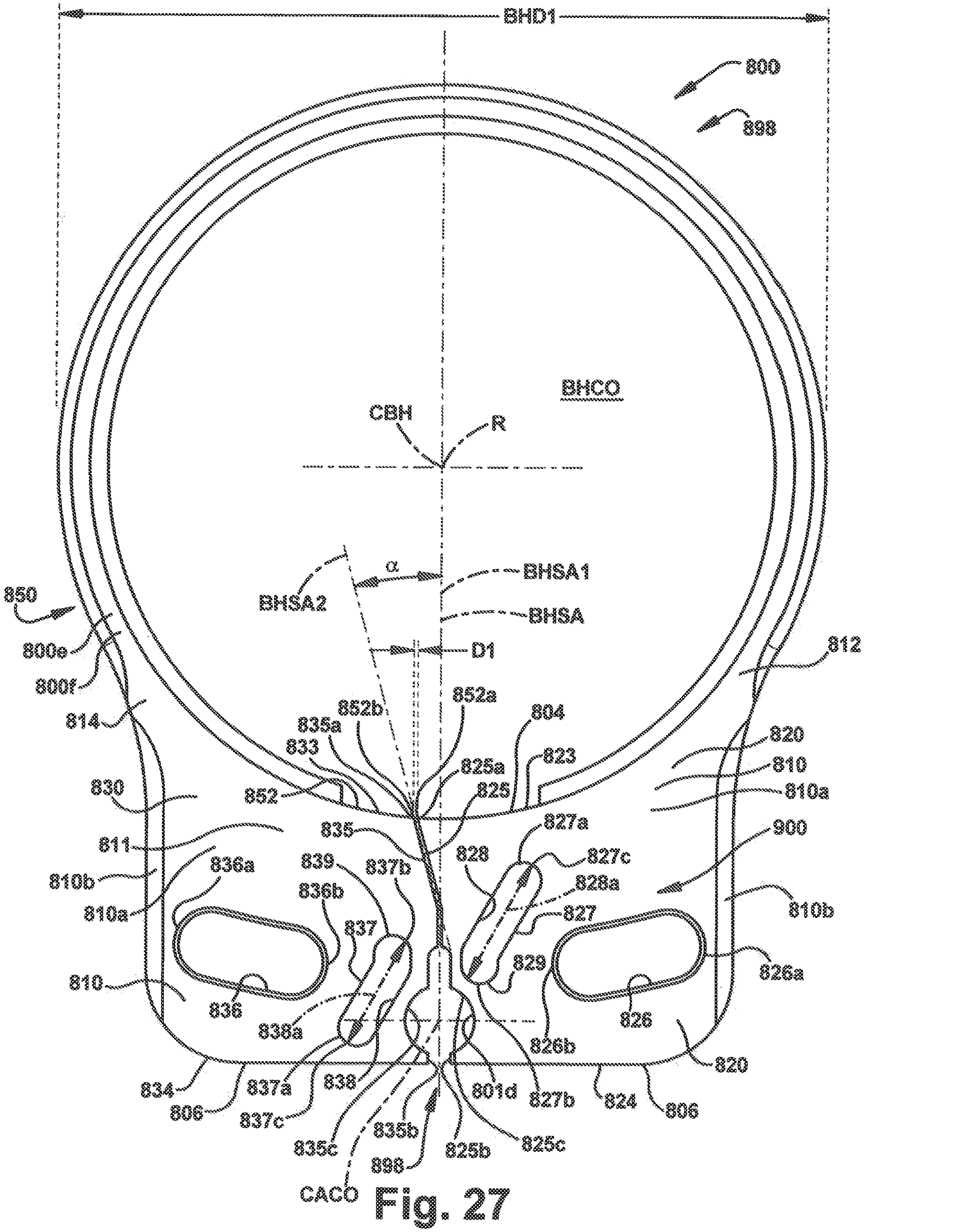
FIG. 27 is a schematic bottom plan view of the annular split ring blade housing of FIG. 26.

As can be seen in FIG. 26, the first body portion 820 includes the generally oval shaped first mounting slot 826 extending between and through the upper and lower surfaces 821, 822, while the second body portion 830 includes the generally oval second mounting slot 836 extending between and through the upper and lower surfaces 831, 832. Unthreaded shaft portions 992 of the pair of threaded fasteners 990 of the cam mechanism 900 pass through the respective mounting slots 826, 836 of first and second body portions 820, 830 of the central region 811 of the mounting section 802 of the blade housing 800. As can be seen in FIGS. 8 and 9, the unthreaded shaft portions 992 of the pair of threaded fasteners 990 are captured in respective cam plate openings 982*a*, 982*b* of the cam plate 950 and the enlarged heads 991 of the pair of fasteners 990 bear against the cam plate 950. The unthreaded shaft portions 992 of the pair of threaded fasteners 990 pass through the respective mounting slots 826, 836 of first and second body portions 820, 830 and the threaded end portions 993 of the pair of fasteners 990 then thread into respective threaded openings 274 of the planar mount pedestal 272 of the lower surface 270 of the fame body 250 to secure the blade housing assembly 700, including the split blade housing 800, to the frame body 250. An upper surface 952 of the cam plate 950 bears against the planar lower surface 810*a* of the blade housing mounting section 802, specifically, the planar lower surfaces 822, 832 of the first and second body portions 820, 830 of the blade housing mounting section 802, to urge the planar upper surface 808*a* of the mounting section 802 against the planar mounting pedestal 272 of the lower surface 270 of the fame body 250 and secure the blade housing 800 to the frame body 250.

Figure 7:
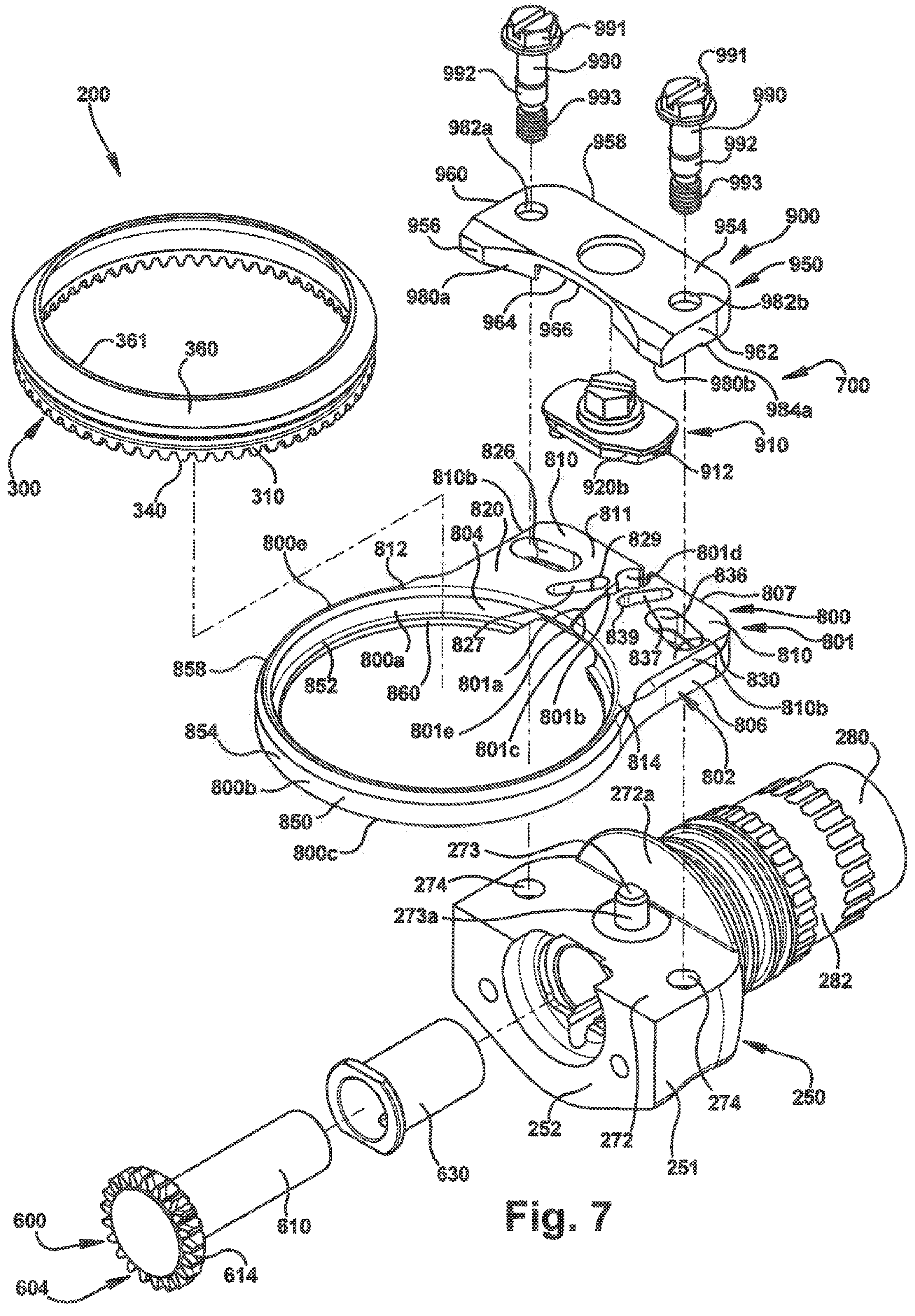
FIG. 7 is a schematic exploded, bottom, front perspective view of the head assembly of the power operated rotary knife of FIG. 1.

As can best be seen in FIGS. 7, 24 and 25, the lower surface 822 of the first body portion 820 includes a first cam slot 827 which receives and constrains a first cam pin 930 of the cam member 910 of the cam mechanism 900. The first cam slot 827 includes a first end portion 827*a* and a second end portion 827*b* that is closer to the first split portion 801*c*. As depicted schematically in FIGS. 24 and 27, the first cam slot 827 includes a linear portion 828 defining a linear path of travel 828*a* for the first cam pin 930 and an offset catch portion 829. The first cam slot 827 is transverse to the first blade housing split axis BHSA1 and the second blade housing split axis BHSA2 and, if extended along the linear path of travel 828*a*, would intersect the blade housing split 801*a* and the first and second blade housing split axes BHSA1, BHSA2. The lower surface 832 of the second body portion 830 includes a second cam slot 837 which receives and constrains a second cam pin 932 of the cam member 910 of the cam mechanism 900. The second cam slot 837 includes a first end portion 837*a* and a second end portion 837*b* that is closer to the split 801*a*. The second cam slot 837 includes a linear portion 838 defining a linear path of travel 838*a* for the second cam pin 932 and an offset catch portion 839. The second cam slot 837 is transverse to the first blade housing split axis BHSA1 and the second blade housing split axis BHSA2 and, if extended along the linear path of travel 838*a*, would intersect the blade housing split 801*a* and the first and second blade housing split axes BHSA1, BHSA2.

As is schematically depicted in FIG. 24, in the first, closed position 998 of the cam mechanism 900, the first cam pin 930 is positioned or located nearer the first end portion 827*a* of the first cam slot 827 and the second cam pin 932 is positioned or located nearer the first end portion 837*a* of the second cam slot 837. In one exemplary embodiment, the first cam pin 930 is positioned in proximity to the first end portion 827*a* of the first cam slot 827 and the second cam pin 932 is positioned in proximity to the first end portion 837*a* of the second cam slot 837. Also, in the first, closed position 998 of the cam mechanism 900, the unthreaded shaft portions 992 of the pair of fasteners 990 are positioned in proximity to or adjacent respective first ends 826*a*, 836*a* of the blade housing mounting slots 826, 836. As the cam member 910 is rotated to the second, open position 999, the first and second cam pins 930, 932 move or translate within their respective first and second cam slots 827, 837 along the respective linear paths of travel 928*a*, 938*a* to positions or locations nearer the respective second end portions 827*b*, 837*b* of the cam slots 827, 837, coming to rest in the respective offset catch portions 829, 839, as is schematically depicted in FIG. 25. The configuration of the offset catch portions 829, 839 advantageously retain and hold the respective first and second cam pins 930, 932 such that the cam member 910 remains in its second, open position 999 and the blade housing remains in the second, blade changing position 899 without constant application of torque to the cam member 910 by a user of the power operated rotary knife 100. The movement or translation of the first and second cam pins 930, 932 within their respective first and second cam slots 827, 837 from the respective first end portions 827*a*, 837*a* to the respective second end portions 827*b*, 837*b* forces, by camming action, an expansion of the blade housing diameter from the unexpanded blade housing diameter BHD1, corresponding to the first, blade supporting position 898 of the blade housing 800, to the expanded blade housing diameter BHD2, corresponding to the second, blade changing position 899 of the blade housing 800, allowing for easy removal of the annular rotary knife blade 300 from the blade housing blade support section 850. Further, as the first and second body portions 820, 830 of the blade housing mounting section 802 move apart or spreads circumferentially along the blade housing split 801*a* such that the blade housing diameter moves from the unexpanded blade housing diameter BHD1 to the expanded blade housing diameter BHD2, the unthreaded shaft portions 992 of the pair of fasteners 990 are now in proximity to or adjacent respective second ends 826*b*, 836*b* of the blade housing mounting slots 826, 836.

Conversely, as the cam member 910 is rotated from the second, open position 999 to the first, closed position 998, the first and second cam pins 930, 932 move or translate within their respective first and second cam slots 827, 837 along the respective linear paths of travel 828*a*, 838*a* from the second end portions 827*b*, 837*b* of the cam slots 827, 837 to positions nearer the respective first end portions 827*a*, 837*a*. In one exemplary or example embodiment, as schematically depicted in FIG. 24, when the cam member 910 is in the first, closed position 998, the first and second cam pins 930, 932 are in proximity to, but slightly spaced from, respective termination locations or actual ends 827*c*, 837*c* of the first end portions 827*a*, 837*a* of the cam slots 827, 837. This slight spacing of the first and second cam pins 930, 932 from the respective termination locations or actual ends 827*c*, 837*c* of the first end portions 827*a*, 837*a* of the cam slots 827, 837 in the first, closed position 998 of the cam member 910 mitigates the possibility that, due to manufacturing tolerances, one or both of the first and second cam pins 930, 932 will contact the termination locations 827*c*, 837*c* of the first end portions 827*a*, 837*a* of the cam slots 827, 837 prior to full contact between the cylindrical side wall 273*a* of the frame body boss 273 and the half-cylinder facing surfaces 825*c*, 835*c* defining the cylindrical opening 801*d* of the first, rearward radial split portion 801*b* of the blade housing expansion split 801*a* of the mounting section 802 of the split blade housing 800. The interfit of the frame body cylindrical boss 273 and the cylindrical opening 801*d* during assembly of the assembled blade—blade housing combination 500 to the frame body 250 provides for: a) proper alignment of the mounting section 802 of the blade housing 800 with respect to the frame body mounting pedestal 272; and b) proper circumferential alignment of the first and second body portions 820, 830 of the mounting section 802, which includes proper circumferential alignment of the forward end portions 825*a*, 835*a* of the facing surfaces 825, 835 at the inner wall 804 of the mounting section 802, as the assembled blade—blade housing combination 500 is secured to the frame body 250 by the pair of threaded fasteners 990. Proper circumferential alignment of the forward end portions 825*a*, 835*a* of the facing surfaces 825, 835 at the inner wall 804 of the mounting section 802 advantageously corresponds to proper circumferential alignment the first and second circumferential ends 852*a*, 852*b* of the inner wall 852 of the blade support section 850, thus providing for a proper, continuous annular shape for the bearing region 860 of the blade support section 850 of the blade housing 800. That is, the contact between the cylindrical side wall 273*a* of the frame body boss 273 and the facing half-cylinders 825*c*, 835*c* defining the cylindrical opening 801*d* of the first, rearward radial split portion 801*b* of the blade housing expansion split 801*a* of the mounting section 802 of the split blade housing 800 results in the blade housing support section 850 and the blade bearing region 860 of the blade support section 850 reverting to the same desired configuration every time the cam member 910 is rotated to its first, closed position 998.

Accordingly, it is desired that there is proper or full cylindrical contact between the cylindrical side wall 273*a* of the frame body boss 273 and the cylindrical opening 801*d* defined by the facing half cylinders 825*c*, 835*c* of the facing surfaces 825, 835 in the region of the first, rearward radial split portion 801*b* of the blade housing expansion split 801*a* of the mounting section 802 of the split blade housing 800. Providing a small gap or spacing, in the first, closed position 998 of the cam member 910, between the first and second cam pins 930, 932 and the termination locations 827*c*, 837*c* of the first end portions 827*a*, 837*a* of the cam slots 827, 837 mitigates the possibility that, due to manufacturing tolerances, one or both of the first and second cam pins 930, 932 will contact the termination locations 827*c*, 837*c* of the first end portions 827*a*, 837*a* of the cam slots 827, 837 prior to full contact between the cylindrical opening 801*d* of the mounting section 802 of the split blade housing 800 and the cylindrical side wall 273*a* of the frame body boss 273, as the cam member 910 is rotated from the second, open position 999 to the first, closed position 998. The movement or translation of the first and second cam pins 930, 932 within their respective first and second cam slots 827, 837 from the respective second end portions 827*b*, 837*b* to the respective first end portions 827*a*, 837*a* allows the blade housing 800, which is resiliently deformable and has the unexpanded blade housing diameter BHD1 as its natural, undeformed condition, by camming action, to return from the expanded blade housing diameter BHD2 to the unexpanded blade housing diameter BHD1.

Further, as the blade housing mounting section 802 moves circumferentially to return to its unexpanded blade housing diameter BHD1, the unthreaded shaft portions 992 of the pair of fasteners 990 are once again in proximity to or adjacent respective first ends 826*a*, 836*a* of the blade housing mounting slots 826, 836. Since the cam member 910 is always set at the specific predetermined rotational orientation with respect to the cam plate 950 and the blade housing mounting section 802, the position of the cam member pins 930, 932 of the cam member 910 are set a specific, predetermined and repeatable locations within their respective cam slots 827, 837. When the cam member 910 is rotated to the first, closed position 998, the cam member pin 930 is precisely positioned within the first end portion 827*a* of the cam slot 827. Similarly, when the cam member 910 is rotated to the first, closed position 998, the cam member pin 932 is precisely positioned within the first end portion 837*a* of the cam slot 837 of the second body portion 830 of the blade housing mounting section 802.

Figure 5:
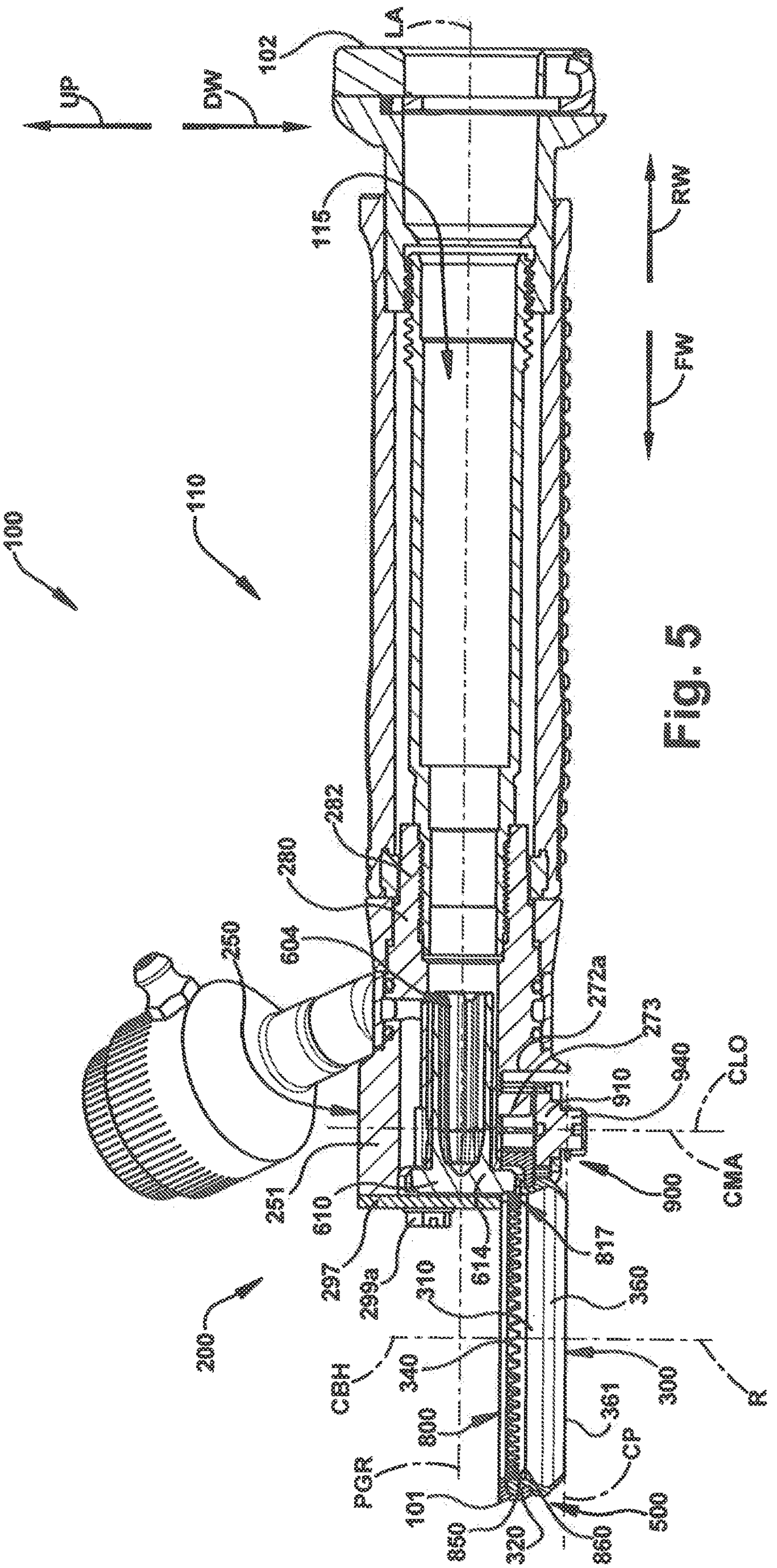
FIG. 5 is a schematic vertical section view taken along a longitudinal axis of the handle assembly of the power operated rotary knife of FIG. 1.

The inner wall 852 of the blade support section 850 defines the bearing region 860 of the blade housing 800. As best seen in FIG. 5, the bearing region 860 of the blade housing 800 engages the bearing region 320 of an upper body 310 of the rotary knife blade 300 to support the blade 300 for rotation about the central axis of rotation R. The inner wall 852 of the blade support section 850 defines a blade housing central opening BHCO (FIGS. 26 and 27) which is centered about and defines the blade housing center line CBH. The blade housing center line CBH, in the first, blade supporting position 898 of the blade housing 800, is substantially coincident with the blade central axis of rotation R. In the second, blade changing position 899 of the blade housing 800, the inner wall 852 of the blade support section 850 takes on a very slight oval or egg-shaped configuration because of the larger split distance D2.

In one exemplary embodiment of the blade housing 800, a thickness or depth of the blade housing 800 is substantially uniform (ignoring the pinion gear recess 815 and the first and second cam slots 827, 837) along the entirety of the blade housing 800 and is approximately 0.21 in. In one exemplary embodiment, a longitudinal extent of the mounting section 802, as measured along the first blade housing split axis BHSA1, is approximately 0.53 in. A total width of the central region of the mounting section 802, in the blade supporting position 898 of the blade housing 800, in one exemplary embodiment, is approximately 1.59 in. In one exemplary embodiment, the blade housing split distance D1 corresponding to the first, blade supporting position 898 of the blade housing 800, as measured at the inner wall 852 of the blade support section 850 in a direction parallel to the first blade housing split axis BHSA1 is approximately 0.01 in., while the blade housing split distance D2 corresponding to the second, blade changing position 899 of the blade housing 800 is approximately 0.30 in. In one exemplary embodiment, the blade housing outer diameter BHD1 corresponding to the first, blade supporting position 898 of the blade housing 800 is approximately 2.08 in., while the blade housing outer diameter BHD2 corresponding to the second, blade changing position 899 of the blade housing is approximately 2.19 in. It will be recognized, of course, that these dimensions will necessarily change based on the size and configuration, characteristics and parameters of the rotary knife blade to be supported by the blade housing, the blade—blade housing bearing structure, and other parameters and characteristics of the power operated rotary knife 100 and components thereof.

Cam Mechanism 900

As best seen in FIGS. 6-25, the cam mechanism 900 includes the cam member 910 and the cam plate 950. The cam plate 950 supports the cam member 910 for rotation about a cam member axis of rotation CMA, which is substantially parallel to the blade housing center line CBH. As noted previously, advantageously, the cam mechanism 900 functions both to: a) secure the assembled blade—blade housing combination 500 to the frame body 250; and b) as desired, allows an operator or maintenance person to selectively change the diameter of the blade support section 850 of the blade housing 800 between the first, unexpanded blade housing diameter BHD1 (for purposes of supporting the rotary knife blade 300 for rotation about the central axis of rotation R during use of the power operated rotary knife 100) and the second, expanded blade housing diameter BHD2 (for purposes of removing the rotary knife blade 300 from the blade housing 800 for purposes of sharpening, blade changing, cleaning and/or maintenance of the power operated rotary knife 100).

Figure 22:
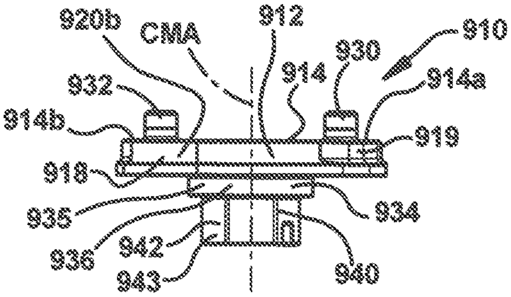
FIG. 22 is a schematic front elevation view of the cam member of FIG. 20, as seen from a plane indicated by the line 22-22 in FIG. 20.
Figure 23:
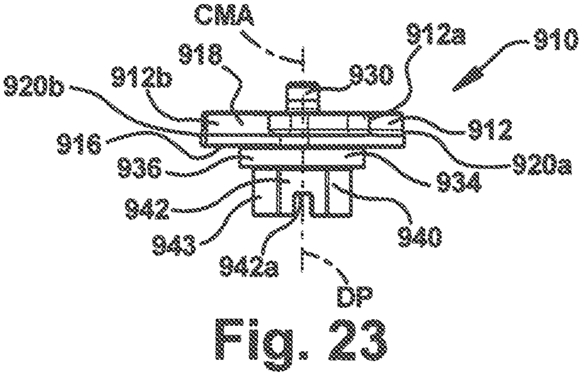
FIG. 23 is a schematic side elevation view of the cam member of FIG. 20, as seen from a plane indicated by the line 23-23 in FIG. 20.

The cam mechanism 900 is intended to be used with a range of split blade housings sizes and a range of rotary knife blade housing sizes. That is, the same cam mechanism 900 may be utilized with smaller diameter split blade housings suitable for rotatably supporting rotary knife blades that are of smaller diameter, e.g., 2 inches in outer diameter, as well as utilized with larger diameter split blade housings suitable for rotatably supporting rotary knife blades that are of larger diameter, e.g., 7 inches in outer diameter. Specifically, with respect to the cam member 910, the cam member 910 comprises a base 912 defined by a side wall 918 and upper and lower surfaces 914, 916. In one exemplary embodiment, the base 912 is generally rectangular, as viewed in top plan view (FIG. 20) and, as best seen in FIGS. 22 and 23, the upper and lower surfaces 914, 916 of the rectangular base 918 are generally planar.

Figure 11:
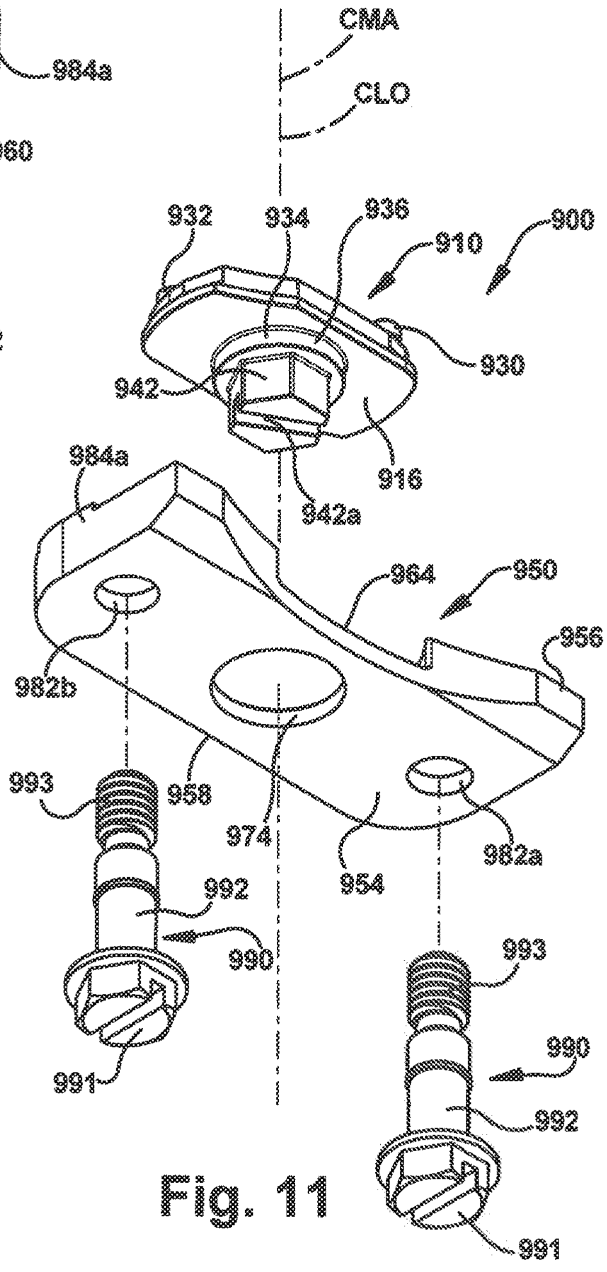
FIG. 11 is a schematic exploded, bottom, front perspective view of the cam mechanism of FIG. 8, with the cam mechanism in the first, closed or locked position.
Figure 13:
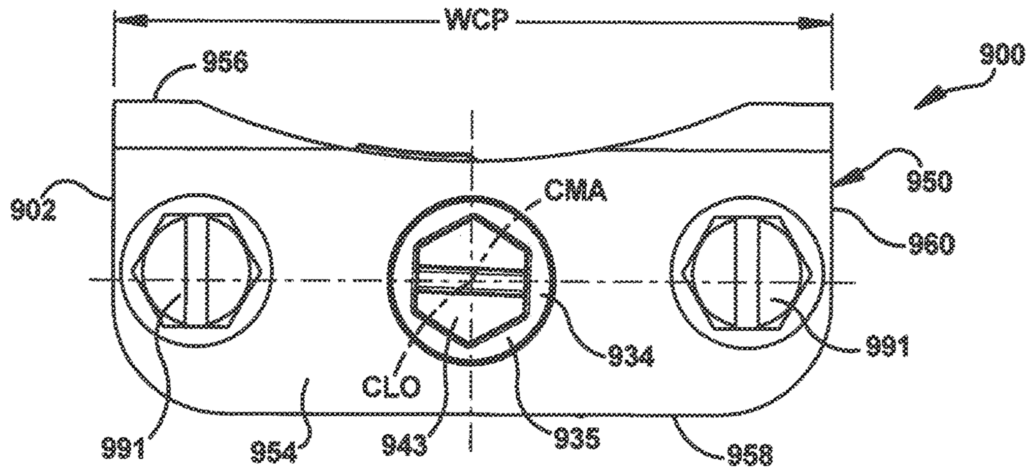
FIG. 13 is a schematic bottom plan view of the cam mechanism of FIG. 8, with the cam mechanism in the second, open or unlocked position.

In one exemplary embodiment, the cam member 910 also includes a boss 934 extending axially downwardly from the planar lower surface 916 of the rectangular base 912. The boss 934 includes an upper cylindrical portion 935 adjacent the planar lower surface 916 and a lower distal portion 940. As best seen in FIGS. 9, 11 and 13, a side wall 936 of the upper cylindrical portion 935 of the cam member 910 is sized to be rotatably received in a central opening 974 of the cam plate 950. The lower distal portion 940 of the boss 934 includes a hex shaped, axially extending body 942. The hex shaped body 942 is sized to receive a standard socket or wrench and thus functions as a cam member actuator 943 for purposes of rotating the cam member 910 about the cam member axis of rotation CMA (FIGS. 20-23). Additionally, a distal end of the hex shaped body 942 includes a slot 942*a* to permit rotation of the cam member 910 about the cam member axis of rotation CMA utilizing a conventional flat head screwdriver. The upper surface 914 of the rectangular base 912 also includes a slot 944 which is sized to receive a conventional flat head screwdriver and thus enables the cam member 910 to be rotated about the cam member axis of rotation CMA from either above or below the cam member 910 during assembly of the cam mechanism 900 to the planar mounting pedestal 272 of the frame body 250 of the head assembly 200.

The cam member 910 further includes the generally cylindrical first and second cam members 930, 932 extending from the planar upper surface 914 of the rectangular base 912. The first and second cam pins 930, 932 are located in opposite corner regions 914*a*, 914*b* of the upper surface 914 of the base 912 and, when viewed in top plan view, are spaced diagonally apart along the upper surface 914 of the rectangular base 912 of the cam member 910. Advantageously, the rectangular base 912 of the cam member 910 is symmetric about a vertical, diagonal plane DP through the first and second cam pins 930, 932. As can best be seen in FIGS. 20, 21 and 23, the diagonal plane DP intersects the first and second cam pins 930, 932 and extends substantially parallel to the cam member axis of rotation CMA. In one exemplary embodiment, the diagonal plane DP intersects and is coincident with the cam member axis of rotation CMA. The diagonal plane DP through the first and second cam pins 930, 932 bisects the rectangular base 912 of cam member 910, resulting in the first and second base portions 912*a*, 912*b* of the rectangular base 912 being on opposite sides of the diagonal plane DP wherein the first and second base portions 912*a*, 912*b* are substantially mirror images of each other about the diagonal plane DP. In one exemplary embodiment, the diagonal plane DP passes through or bisects the first and second cam pins 930, 932 and intersects and is coincident with the cam member axis of rotation CMA. Accordingly, since the rectangular base 912 of the cam member 910 is symmetric about the diagonal plane DP, the side wall 918 of the rectangular base 912 is also symmetric about the diagonal plane DP. Stated another way, the side wall 918 of the cam member 910 is symmetric with respect to the diagonal plane DP, wherein the diagonal plane DP intersects the first and second cam pins 930, 932 of the cam member 910 and extends substantially parallel to the cam member axis of rotation CMA. Additionally, as mentioned above, in one exemplary embodiment, the diagonal plane DP intersects and is coincident with the cam member axis of rotation CMA.

The symmetric configuration of the cam member 910 and, specifically, the cam member rectangular base 912 and side wall 918 of the rectangular base 912, about the diagonal plane DP advantageously provides for: a) efficiency in fabrication of the cam member 910; and b) ease of assembly of the cam mechanism 900 to the planar mounting pedestal 272 of the lower surface 270 of the forward portion 251 of the frame body 250, with supported blade housing 800 sandwiched therebetween. Assembly the cam member 910 and the cam plate 950 is facilitated because the cam member 910, being symmetric about the vertical, diagonal plane DP, can be placed in the seating region 966 defined by the recess 964 of the upper surface 952 of the cam plate 950 in either of two orientations which are 180 degrees apart as viewed with respect to the cam member axis of rotation CMA. That is, for assembly purposes, front and back sides of the cam member 910 are interchangeable. Thus, depending on the orientation of the cam member 910 in the cam plate seating region 966, one cam pin of the pair of cam pins will function as the first cam pin 930 and be positioned in the first cam slot 827 in the lower surface 822 of the first body portion 820 of the central region 811 of the mounting section 802 of the split blade housing 800 and the other of the pair of cam pins will function as the second cam pin 932 and be positioned in the second cam slot 837 in the lower surface 832 of the second body portion 830 of the central region 811 of the mounting section 802 of the split blade housing 800.

In one exemplary embodiment, the entirety of the cam member 910 (including the rectangular base 912, the first and second cam pins 930, 932 extending from the upper surface 914 of the base 912, and the boss 934 extending from the lower surface 916 of the base 912) is symmetric about the diagonal plane DP. However, it should be understood that the cam member 910 could have a non-symmetric features, for example, a non-symmetric boss 934 and, provided that the base 912 and specifically, the side wall 918 of the base 912, is symmetric about the diagonal plane DP, still achieve certain advantages of fabrication of the cam member 910 and assembly of the cam mechanism 900 to the frame body mounting pedestal 270.

In one exemplary embodiment, the side wall 918 of the rectangular base 912 includes a pair of diagonally spaced curved corner portions 919*a*, 919*b* which are bisected by the diagonal plane DP and a pair of truncated or recessed regions 920*a*, 920*b* comprising the opposite two corner portions, which extend generally parallel to the diagonal plane DP. The truncated regions 920*a*, 920*b* advantageously provide clearance necessary for use of the cam mechanism with larger diameter rotary knife blades and corresponding larger diameter blade housings. For example, as seen in FIG. 25, the truncated corner region 920*b* of the rectangular base 912 is truncated or angled thereby providing for additional clearance between the side wall 918 of the cam member 910 and the rotary knife blade 300 when the cam member 910 is rotated to the second, unlocked position 999 of the cam mechanism 900.

Figure 10:
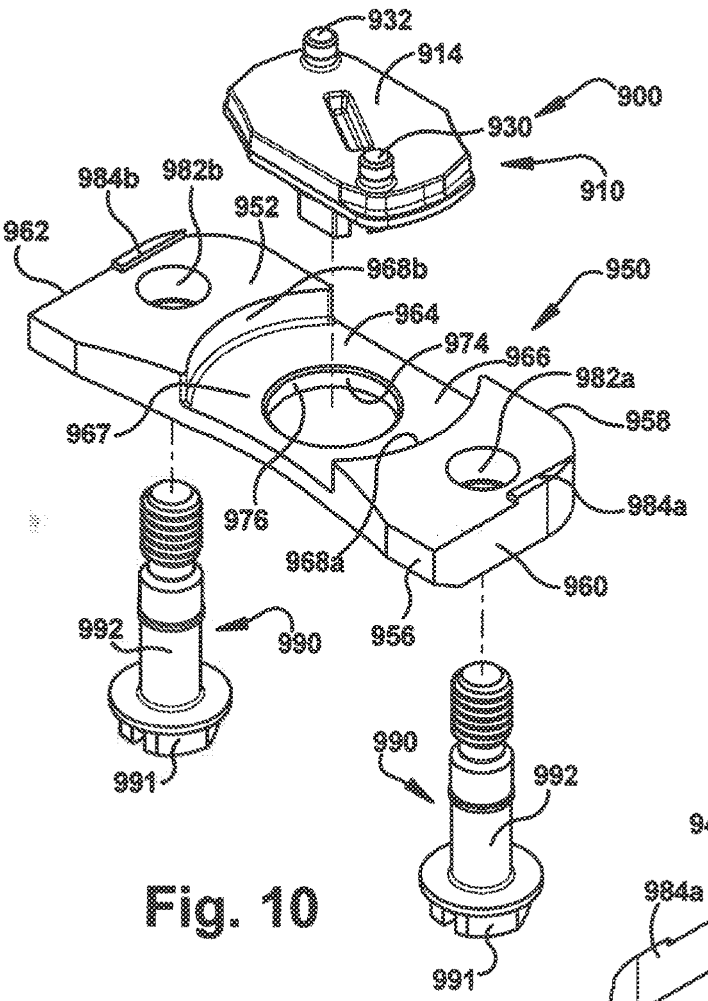
FIG. 10 is a schematic exploded, top, front perspective view of the cam mechanism of FIG. 8, with the cam mechanism in the first, closed or locked position.
Figure 12:
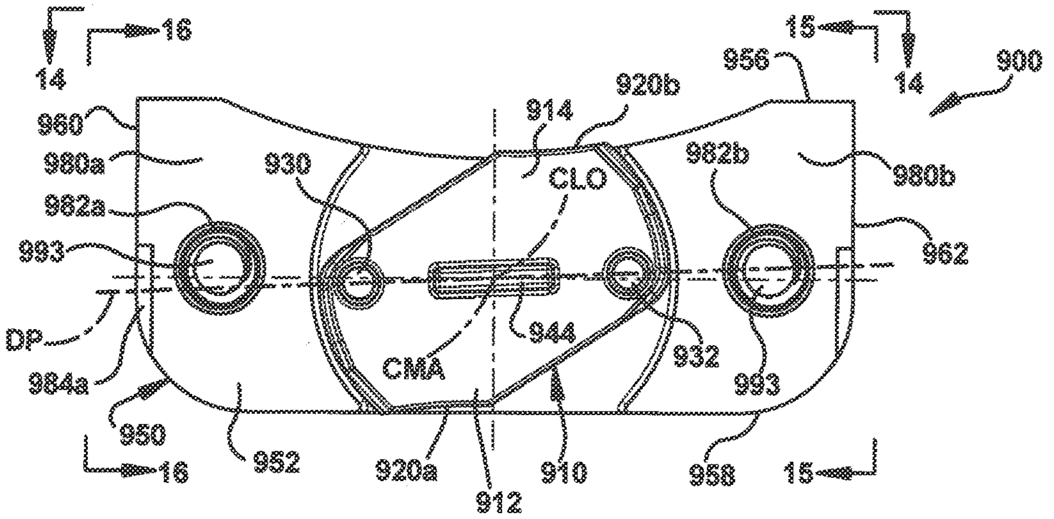
FIG. 12 is a schematic top plan view of the cam mechanism of FIG. 8, with the cam mechanism in a second, open or unlocked position.
Figure 14:
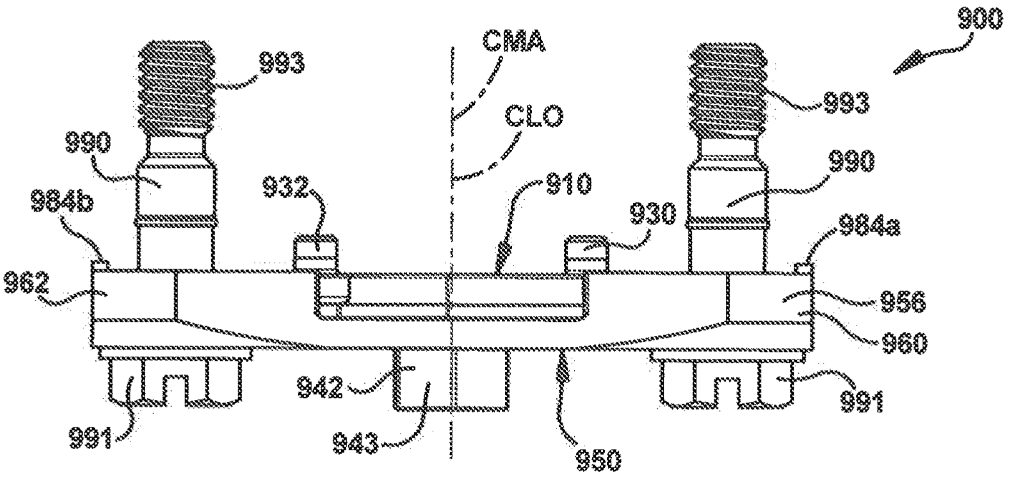
FIG. 14 is a schematic front elevation view of the cam mechanism of FIG. 8, with the cam mechanism in the second, open or unlocked position, as seen from a plane indicated by the line 14-14 in FIG. 12.
Figure 15:
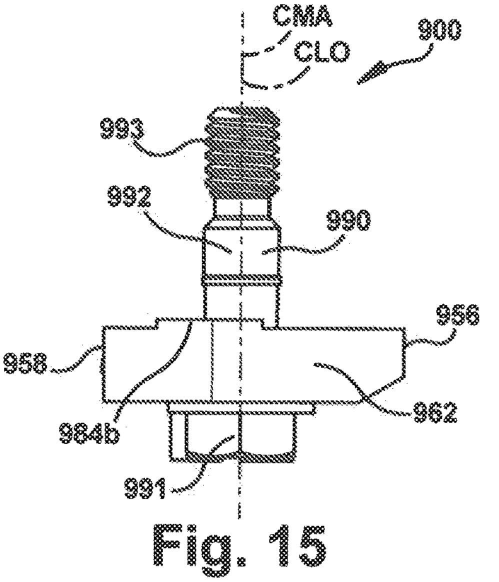
FIG. 15 is a schematic side elevation view of the cam mechanism of FIG. 8, with the cam mechanism in the second, open or unlocked position, as seen from a plane indicated by the line 15-15 in FIG. 12.
Figure 16:
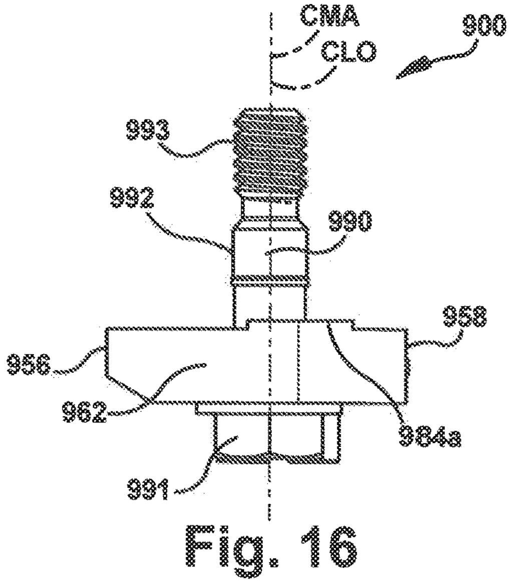
FIG. 16 is a schematic top plan view of the cam mechanism of FIG. 8, with the cam mechanism in a second, open or unlocked position, as seen from a plane indicated by the line 16-16 in FIG. 12.
Figure 17:
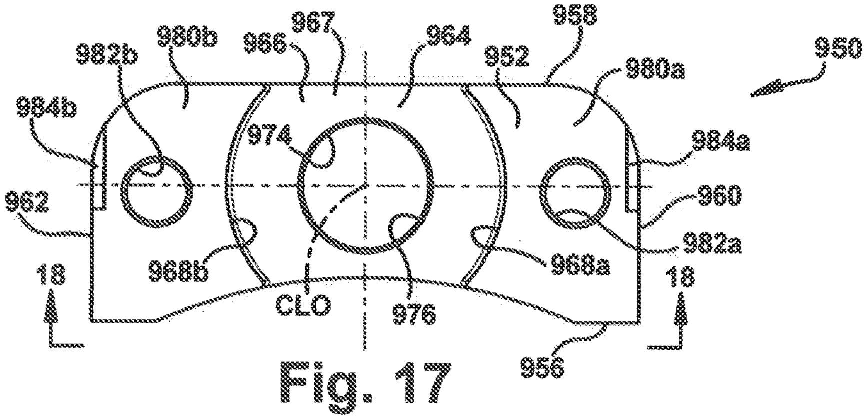
FIG. 17 is a schematic top plan view of a cam plate of the cam mechanism of FIG. 8.
Figure 18:
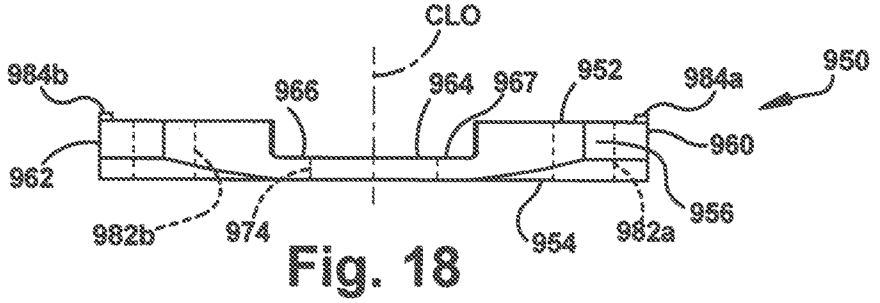
FIG. 18 is a schematic front elevation view of the cam plate of FIG. 17, as seen from a plane indicated by the line 18-18 in FIG. 17.
Figure 19:
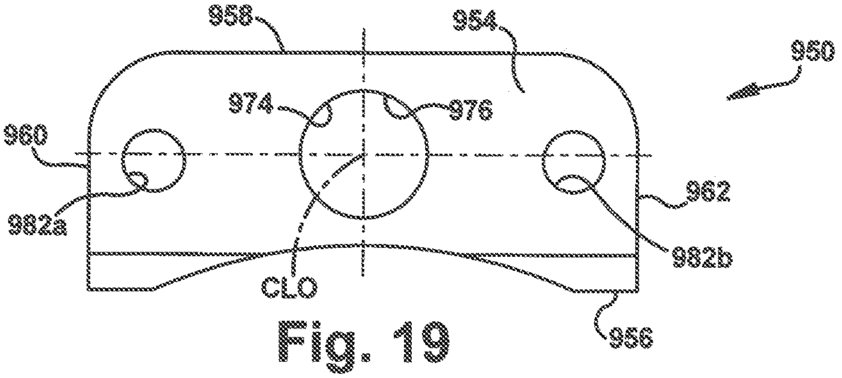
FIG. 19 is a schematic bottom plan view of the cam plate of FIG. 17.
Figure 20:
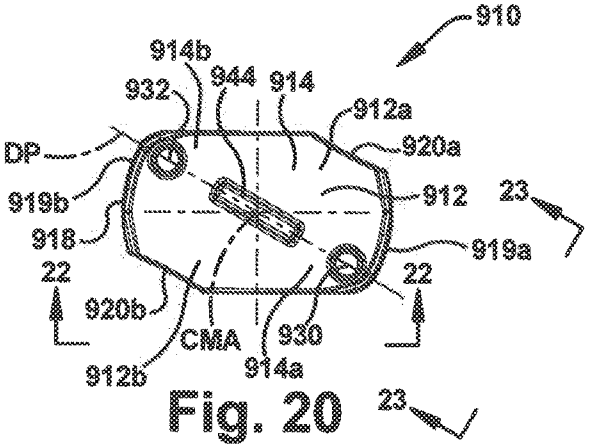
FIG. 20 is a schematic top plan view of a cam member of the cam mechanism of FIG. 8.
Figure 21:
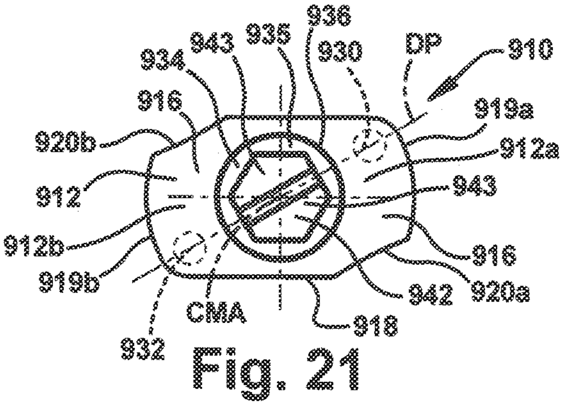
FIG. 21 is a schematic bottom plan view of the cam member of FIG. 20.

As best seen in FIGS. 8-19, the cam plate 950 of the cam mechanism 900 is generally rectangular in plan view and includes an upper surface 952 and a spaced apart generally planar lower surface 954. The upper and lower surfaces 952, 954 are spaced apart by a front side 956, facing toward the annular rotary knife blade 300, and a back side 958, facing toward the handle assembly 110. Extending between the front and back sides 956, 958 of the cam plate 950 are first and second lateral sides 960, 962. The upper surface 952 of the cam plate 950 includes the generally rectangular recess 964 that receives and supports the cam member 910. Positioned on either side of the recess 964 are flanking portions 980*a*, 980*b* of the cam plate 950 that extend a full width or distance between the upper and lower surfaces 952, 954. The upper surface recess 964 defines the seating region 966 for the cam member 910. The recess 964 extends through the front and back sides 956, 958 of the cam plate 950. The recess 964 is defined by a planar lower wall 967 and two side walls 968*a*, 968*b* that extend from the front side 956 to the back side 958 of the cam plate 950. The planar lower wall 967 of the recess 964 is generally parallel to and intermediate between the upper and lower surfaces 952, 954 of the cam plate 950. A centrally located opening 974 extends through lower surface 954 of the cam plate 950 and intersects the recess 964, passing though the planar lower wall 967 of the recess 964. As best seen in FIGS. 10, 12 and 14, the upper surface 952 of the cam plate 950 adjacent the lateral sides 960, 962 includes the pair of upwardly extending edges 984*a*, 984*b* which interfit into respective angled recessed portions 810*b* of the blade housing mounting section 802 helps insures proper alignment of the mounting section 802 of the blade housing 800 and the cam plate 950.

As the cam member 910 is rotated about the cam member axis of rotation CMA from the second, open or unlocked position 999 (shown schematically in FIG. 25) to the first, closed or locked position 998 (show schematically in FIG. 24), movement or translation of the first and second cam pins 930, 932 move or translate within their respective first and second cam slots 827, 837 from the respective second end portions 827*b*, 837*b* of the first and second cam slots 827, 837 to the respective first end portions 827*a*, 837*a* of the first and second cam slots 827, 837 causing, by camming action, the split blade housing 800 to move from the second, blade changing position 899 of the blade housing to the first, blade supporting position 898 of the blade housing 800. The translation of the first and second cam pins 930, 932 to the respective first end portions 827*a*, 837*a* of the first and second cam slots 827, 837, along with the elasticity of the split blade housing 800 which tends to move the blade housing 800 to its natural, undeformed condition wherein the blade housing diameter is diameter BHD1, cause the mounting section 802 of the blade housing 800 to be precisely and repeatably moved to the same position or configuration in the first, blade supporting position 898 such that the split distance at the termination position 801*e* is split distance D1 when the cam member 910 is in the first, closed position 998.

As the cam member 910 is rotated about the cam member axis of rotation CMA to the first, closed or locked position 998 to the second, open or unlocked position 999, movement or translation of the first and second cam pins 930, 932 move or translate within their respective first and second cam slots 827, 837 from the respective first end portions 827*a*, 837*a* of the first and second cam slots 827, 837 to the respective offset catch portions 829, 839 of the second end portions 827*b*, 837*b* of the first and second cam slots 827, 837 causing, by camming action, the split blade housing 800 to move from the first, blade supporting position 898 of the blade housing 800 to the second, blade changing position 899 of the blade housing 800. The translation of the first and second cam pins 930, 932 to the respective offset catch portions 829, 839 of the second end portions 827*b*, 837*b* of the first and second cam slots 827, 837, cause the mounting section 802 of the blade housing 800 to be precisely and repeatably moved to the same position or configuration in the second, blade changing position 899 such that the split distance at the termination position 801*e* is split distance D2 when the cam member 910 is in the second, open position 999.

A center line CLO through the central opening 974 defines and is coincident with the cam member axis of rotation CMA. In one exemplary embodiment, as best seen in a comparison of FIGS. 24 and 25, a rotational path of travel of the cam member 910 in moving between the first, closed position 998 and the second, open position 999 is approximately 45°. In one exemplary embodiment of the cam member 910, a thickness or depth of the rectangular base 912 is substantially uniform (ignoring the upwardly extending cam pins 930, 932 and the downwardly extending boss 934) and is approximately 0.10 in. In one exemplary embodiment, a diagonal extent of the cam member rectangular base 912, as measured along the diagonal plane DP and along the lower surface 916 of the rectangular base 912, is approximately 0.78 in. In one exemplary embodiment, a thickness or depth of the cam plate 950 (not including the longitudinal raised edges 984*a*, 984*b* is approximately 0.17 in and a width WCP (FIG. 13) is approximately 1.59 in. As noted previously, it is understood, that these dimensions will necessarily change based on the size and configuration, characteristics and parameters of the split blade housing to be moved between the first, blade supporting position and the second, blade changing position, the rotary knife blade to be supported by the blade housing, the blade—blade housing bearing structure, and other parameters and characteristics of the power operated rotary knife 100 and components thereof.

Assembly of Cam Mechanism 900

Advantageously, the cam mechanism 900 of the present disclosure does not require assembly of the cam member 910 to the cam plate 950 prior to attachment of the cam mechanism 900 and the split blade housing 800 to the mounting pedestal 272 of the frame body 250 of the head assembly 200 of the power operated rotary knife 100. Additionally, nor does the cam plate 950 require any retainer springs to maintain the cam member 910 within the seating region 964 of the recess 954 of the upper surface 952 of the cam plate 950. The rotary knife 100 placed on table or surface such that the mounting pedestal 272 is facing the upward direction UP (that is, for example, in the orientation of the head assembly 200 depicted in FIG. 7). To install the cam mechanism 900 and split blade housing 800 to the frame body mounting pedestal 272, the blade housing mounting section 802 is placed on the frame body mounting pedestal 272. The cam member 910 is then placed on the blade housing mounting section 802 such that the first and second cam pins 930 are received in respective first and second cam slots 827, 837 of the lower surfaces 822, 832 of the first and second body portions 820, 830 of the blade housing mounting section 802. The cam plate 850 is then placed over the cam member 910 such that the downward extending boss 934 projects thought the central opening 974 of the cam plate 950.

The pair of threaded fasteners 990 are then positioned to extend through the cam plate openings 982*a*, 982*b* of the flanking portions 980*a*, 980*b* and extend through mounting slots 826, 836 of the first and second body portions 820, 830 of the split blade housing mounting section 802 and aligned with the threaded openings 274 of the mounting pedestal 272 defined by the lower surface 270 of the frame body 250. The pair of threaded fasteners 990 are then tightened into the respective mounting pedestal threaded openings 274 until the fasteners 990 are approximately one turn from being tight. The cam actuator 943 of the hex body 942 of the cam member 910 is then turned about ⅛ turn clockwise causing the first and second cam pins 930, 932 to move along the cam slots 827, 837 and engage be retained in the respective offset catch portions 829, 839 of the second end portions 827*b*, 837*b* of the first and second cam slots 827, 837. Thus, the cam mechanism 900 will be set in the second, unlocked or open position 999 of the cam mechanism 900 and the blade housing 800 will be set in the second, blade changing position 899. The rotary knife blade 300 is then inserted into the open split blade housing 800. The cam actuator 943 of the hex body 952 of the cam member 910 is then turned counter clockwise causing the first and second cam pins 930, 932 to move from the respective offset catch portions 829, 839 and translate along the first and second cam slots 827, 837 to the respective first end portions 827*a*, 837*a* of the first and second cam slots 827, 837. Thus, the cam mechanism 900 will be set in the first, locked or closed position 998 of the cam mechanism 900 and the blade housing 800 will be set in the first, blade holding position 898. The pair of threaded fasteners 990 are then tightened a final turn and the power operated rotary knife 100 is ready for use.

As used herein, terms of orientation and/or direction such as front, rear, forward, rearward, distal, proximal, distally, proximally, upper, lower, inward, outward, inwardly, outwardly, horizontal, horizontally, vertical, vertically, axial, radial, longitudinal, axially, radially, longitudinally, etc., are provided for convenience purposes and relate generally to the orientation shown in the Figures and/or discussed in the Detailed Description. Such orientation/direction terms are not intended to limit the scope of the present disclosure, this application, and/or the invention or inventions described therein, and/or any of the claims appended hereto. Further, as used herein, the terms comprise, comprises, and comprising are taken to specify the presence of stated features, elements, integers, steps or components, but do not preclude the presence or addition of one or more other features, elements, integers, steps or components. Axially above or axially spaced above, as used herein, means positioned above as viewed with respect to an axis, for example, the blade housing center line CBH of split blade housing 800, even if the two elements are not in axial alignment with respect to the axis. The terms axially below or axially spaced below, as used herein, means positioned below as viewed with respect to an axis, for example, the blade housing center line CBH of split blade housing 800, even if the two elements are not in axial alignment with respect to the axis. Similarly, axially extending, as used here, means one element extends from and is positioned above or below a second element with respect to an axis, even if the two elements are not in axial alignment with respect to the axis. Similarly, the terms radially offset from, radially outward of, radially inward of, as used herein, means one element is positioned offset from a second element, as viewed along a radius line extending radially from an axis, for example, the blade housing center line CBH of split blade housing 800, even if the two elements are not in radial alignment along the radius line because one element is axially above or axially below the other element.

What have been described above are examples of the present disclosure/invention. It is, of course, not possible to describe every conceivable combination of components, assemblies, or methodologies for purposes of describing the present disclosure/invention, but one of ordinary skill in the art will recognize that many further combinations and permutations of the present disclosure/invention are possible. Accordingly, the present disclosure/invention is intended to embrace all such alterations, modifications, and variations that fall within the spirit and scope of the appended claims.

What is claimed is:

1. A cam mechanism bridging a split through a mounting section of a split blade housing of a power operated rotary knife for moving the split blade housing between a first, blade supporting position and a second blade changing position, the cam mechanism comprising:

a) a cam plate including a cam plate first surface and a cam plate second surface spaced apart by a side wall extending between the cam plate first and second surfaces, the cam plate including an opening extending through the cam plate first and second surfaces, the opening of the cam plate being cylindrical and centered about a cam member axis of rotation, the cylindrical opening of the cam plate being a circle in plan view; and b) a cam member supported by the cam plate for rotation about the cam member axis of rotation, the cam member rotating between a first position and a second position, the cam member including a cam member first surface and a cam member second surface spaced apart by a side wall, the cam member first surface including a first cam pin extending from the cam member first surface and a second cam pin extending from the cam member first surface, the cam member second surface including a boss extending from the cam member second surface having an upper portion that is received in the cylindrical opening of the cam plate, the side wall of the cam member being symmetric with respect to a diagonal plane which intersects the first and second cam pins and which extends substantially parallel to the cam member axis of rotation.

2. The cam mechanism of claim 1 wherein the side wall of the cam member includes a first truncated region and a second truncated region, the first and second truncated regions being substantially parallel to the diagonal plane.

3. The cam mechanism of claim 1 wherein the diagonal plane intersects the cam member axis of rotation.

4. The cam mechanism of claim 1 wherein the first surface of the cam plate includes a recessed region bounding the opening and the cam member includes a generally rectangular base including the first and second surfaces and the side wall of the cam member, the base being received in the recessed region of the cam plate.

5. The cam mechanism of claim 1 wherein the recessed region of the cam plate includes a planar lower wall.

6. The cam mechanism of claim 1 wherein the recessed region of the first surface of the cam plate is bounded by a first arcuate surface on one side of the cam plate opening and a second arcuate surface on an opposite side of the cam plate opening.

7. The cam mechanism of claim 6 wherein the first arcuate surface of the recessed region of the first surface of the cam plate is centered about the cam member axis of rotation and the second arcuate surface of the recessed region of the first surface of the cam plate is centered about the cam member axis of rotation.

8. The cam mechanism of claim 1 wherein the boss of the cam member includes an actuator for rotating the cam member between the first position and the second position.

9. A cam mechanism bridging a split through a mounting section of a split blade housing of a power operated rotary knife for moving the split blade housing between a first, blade supporting position and a second blade changing position, the cam mechanism comprising:

a) a cam plate including a cam plate first surface and a cam plate second surface spaced apart by a side wall extending between the cam plate first and second surfaces, the cam plate including an opening extending through the cam plate first and second surfaces, the opening of the cam plate being cylindrical and centered about a cam member axis of rotation, the cylindrical opening of the cam plate being a circle in plan view; and b) a cam member supported by the cam plate for rotation about the cam member axis of rotation, the cam member rotating between a first position and a second position, the cam member including a cam member first surface and a cam member second surface spaced apart by a side wall, the cam member first surface including a first cam pin extending from the cam member first surface and a second cam pin extending from the cam member first surface, the cam member second surface including a boss extending from the cam member second surface having an upper portion that is received in the cylindrical opening of the cam plate, the side wall of the cam member including a first truncated region and a second truncated region, the first and second truncated regions being substantially parallel to a diagonal plane which intersects the first and second cam pins and which extends substantially parallel to the cam member axis of rotation.

10. The cam mechanism of claim 9 wherein the side wall of the cam member is symmetric with respect to the diagonal plane.

11. The cam mechanism of claim 9 wherein the diagonal plane intersects the cam member axis of rotation.

12. The cam mechanism of claim 9 wherein the first surface of the cam plate includes a recessed region bounding the opening and the cam member includes a generally rectangular base including the first and second surfaces and the side wall of the cam member, the base being received in the recessed region of the cam plate.

13. The cam mechanism of claim 9 wherein the recessed region of the cam plate includes a planar lower wall.

14. The cam mechanism of claim 9 wherein the recessed region of the first surface of the cam plate is bounded by a first arcuate surface on one side of the cam plate opening and a second arcuate surface on an opposite side of the cam plate opening.

15. The cam mechanism of claim 14 wherein the first arcuate surface of the recessed region of the first surface of the cam plate is centered about the cam member axis of rotation and the second arcuate surface of the recessed region of the first surface of the cam plate is centered about the cam member axis of rotation.

16. A blade housing assembly for supporting an annular rotary knife blade of a power operated rotary knife for rotation about a knife blade central axis of rotation, the blade housing assembly comprising:

a) a split blade housing including an annular blade support section having an inner wall and a mounting section extending from the annular blade support section, the mounting section including a split extending through the mounting section and the inner wall of the blade support section, the mounting section including a first cam slot in a first portion of the mounting section on one side of the split and a second cam slot in a second portion of the mounting section on an opposite side of the split, the split blade housing being movable between a first, blade holding position and a second, blade changing position, the inner wall of the blade support section having a greater diameter in the second, blade changing position than in the first, blade supporting position; and b) a cam mechanism engaging the split blade housing for moving the split blade housing between the first, blade supporting position and the second blade changing position, the cam mechanism including:

1) a cam plate bridging the first and second portions of the mounting section of the split blade housing and including a cam plate first surface and a cam plate second surface spaced apart by a side wall extending between the cam plate first and second surfaces, the cam plate including an opening extending through the cam plate first and second surfaces, the opening of the cam plate being cylindrical and centered about a cam member axis of rotation, the cylindrical opening of the cam plate being a circle in plan view; and 2) a cam member supported by the cam plate for rotation about the cam member axis of rotation, the cam member rotating between a first position and a second position, the cam member including a cam member first surface and a cam member second surface spaced apart by a side wall, the cam member first surface including a first cam pin extending from the cam member first surface and received in the first cam slot of the first portion of the split blade housing mounting section and a second cam pin extending from the cam member first surface and received in the second cam slot in the second portion of the split blade housing mounting section, the cam member second surface including a boss extending from the second surface having an upper portion that is received in the cylindrical opening of the cam plate, the side wall of the cam member being symmetric with respect to a diagonal plane which intersects the first and second cam pins and which extends substantially parallel to the cam member axis of rotation.

17. The blade housing assembly of claim 16 wherein the side wall of the cam member of the cam mechanism includes a first truncated region and a second truncated region, the first and second truncated regions being substantially parallel to the diagonal plane.

18. The blade housing assembly of claim 16 wherein the first surface of the cam plate includes a recessed region bounding the opening and the cam member includes a generally rectangular base including the first and second surfaces and the side wall of the cam member, the base being received in the recessed region of the cam plate.

19. A power operated rotary knife comprising:

a) an annular rotary knife blade rotating about a knife blade central axis of rotation;

b) a blade housing assembly including:

1) a split blade housing supporting the annular rotary knife blade for rotation about the knife blade central axis of rotation, the split blade housing including an annular blade support section having an inner wall and a mounting section extending from the annular blade support section, the mounting section including a split extending through the mounting section and the inner wall of the blade support section, the mounting section including a first cam slot in a first portion of the mounting section on one side of the split and a second cam slot in a second portion of the mounting section on an opposite side of the split, the split blade housing being movable between a first, blade holding position and a second, blade changing position, the inner wall of the blade support section having a greater diameter in the second, blade changing position than in the first, blade supporting position; and 2) a cam mechanism engaging the split blade housing for moving the split blade housing between the first, blade supporting position and the second blade changing position, the cam mechanism including:

i) a cam plate bridging the first and second portions of the mounting section of the split blade housing and including a cam plate first surface and a cam plate second surface spaced apart by a side wall extending between the first and second surfaces, the cam plate including an opening extending through the first and second surfaces, the opening of the cam plate being cylindrical and centered about a cam member axis of rotation, the cylindrical opening of the cam plate being a circle in plan view; and ii) a cam member supported by the cam plate for rotation about a cam member axis of rotation, the cam member rotating between a first position and a second position, the cam member including a cam member first surface and a cam member second surface spaced apart by a side wall, the cam member first surface including a first cam pin extending from the cam member first surface and received in the first cam slot of the first portion of the split blade housing mounting section and a second cam pin extending from the cam member first surface and received in the second cam slot in the second portion of the split blade housing mounting section, the cam member second surface including a boss extending from the second surface having an upper portion that is received in the cylindrical opening of the cam plate, the side wall of the cam member being symmetric with respect to a diagonal plane which intersects the first and second cam pins and which extends substantially parallel to the cam member axis of rotation.

20. The power operated rotary knife of claim 19 wherein the side wall of the cam member of the cam mechanism includes a first truncated region and a second truncated region, the first and second truncated regions being substantially parallel to the diagonal plane.

* * * * *